United States Patent
Mackey et al.

(10) Patent No.: US 9,210,187 B1
(45) Date of Patent: Dec. 8, 2015

(54) TRANSPARENT DENIAL OF SERVICE PROTECTION

(71) Applicant: Centri Technology, Inc., Seattle, WA (US)

(72) Inventors: Michael Patrick Mackey, Lake Stevens, WA (US); Luis Gerardo Paris, Maple Valley, WA (US); Charles Hubbard Taylor, Seattle, WA (US)

(73) Assignee: Centri Technology, Inc., Seattle, WA (US)

( * ) Notice: Subject to any disclaimer, the term of this patent is extended or adjusted under 35 U.S.C. 154(b) by 0 days.

(21) Appl. No.: 14/815,647

(22) Filed: Jul. 31, 2015

Related U.S. Application Data

(60) Provisional application No. 62/102,942, filed on Jan. 13, 2015.

(51) Int. Cl.
*H04L 29/06* (2006.01)
*G06F 11/00* (2006.01)

(52) U.S. Cl.
CPC ........ *H04L 63/1458* (2013.01); *H04L 63/0428* (2013.01); *H04L 69/22* (2013.01)

(58) Field of Classification Search
CPC ..... H04L 47/10; H04L 63/0227; H04L 63/20; H04L 63/1408; H04L 63/1441; H04L 63/12; H04L 47/32; H04L 2463/141; H04L 63/061; H04L 63/04; H04L 9/32; H04L 9/0819; H04L 63/1458; H04L 69/22; H04L 63/0428
See application file for complete search history.

(56) References Cited

U.S. PATENT DOCUMENTS

| | | | | |
|---|---|---|---|---|
| 6,092,191 A | * | 7/2000 | Shimbo | H04L 64/0428 380/258 |
| 6,389,532 B1 | * | 5/2002 | Gupta | H04L 63/0227 370/351 |
| 6,661,896 B1 | * | 12/2003 | Barnett | H04L 63/12 380/260 |
| 7,073,196 B1 | * | 7/2006 | Dowd | H04L 63/0263 370/395.52 |
| 8,085,171 B2 | | 12/2011 | Paris | |
| 8,804,814 B1 | | 8/2014 | Paris et al. | |
| 8,886,926 B2 | | 11/2014 | Paris et al. | |
| 2003/0007489 A1 | * | 1/2003 | Krishnan | H04L 29/06 370/392 |
| 2003/0097557 A1 | * | 5/2003 | Tarquini | G06F 21/55 713/153 |

(Continued)

OTHER PUBLICATIONS

Paris, L. "Inside Centri's BitSmart Optimization Technology—CMC: Paving the way for real-time data acceleration," Mobile World Congress, 2013 (7 pages).

*Primary Examiner* — Darren B Schwartz
(74) *Attorney, Agent, or Firm* — John W. Branch; Lowe Graham Jones PLLC

(57) ABSTRACT

Embodiments are directed toward transparent denial of service protection. Instruction set information that references a seed file may be communicated to a client computer. A network packet key may be generated based on the instruction set information or encrypted and provided by a server. A client computer may generate a client network packet key based on the instruction set information provided by the network computer and a seed file installed on the client computer. The client computer may include the client network packet key the one or more network packets that it is sending to the network computer before they are provided to the network computer. A packet rule that includes the network packet key may be generated and installed in a packet inspection engine. If network packets are received, the packet inspection engine compares the network packet key to the network packets using the packet rule.

27 Claims, 23 Drawing Sheets

(56) References Cited

U.S. PATENT DOCUMENTS

| | | | | |
|---|---|---|---|---|
| 2004/0098485 A1* | 5/2004 | Larson | | H04L 29/12066 709/227 |
| 2004/0205359 A1* | 10/2004 | Matsuhira | | H04L 63/0263 713/154 |
| 2005/0216730 A1* | 9/2005 | Morino | | H04L 63/061 713/153 |
| 2008/0134332 A1* | 6/2008 | Keohane | | H04L 63/0227 726/23 |
| 2011/0145572 A1* | 6/2011 | Christensen | | H04L 63/126 713/160 |
| 2013/0305367 A1* | 11/2013 | Yoshioka | | H04L 51/12 726/23 |
| 2015/0095648 A1* | 4/2015 | Nix | | H04W 52/0235 713/170 |

* cited by examiner

TRANSPARENT DENIAL OF SERVICE PROTECTION

CROSS-REFERENCE TO RELATED APPLICATION(S)

This application is a Utility Patent application that claims the benefit of previously filed U.S. Provisional Patent application, U.S. Ser. No. 62/102,942 filed on Jan. 13, 2015, under 35 U.S.C. §119(e) and incorporated herein by reference.

TECHNICAL FIELD

The invention relates generally to communication over computer networks, and more particularly, but not exclusively to protecting communication networks from malicious communications.

BACKGROUND

More and more service providers are moving their applications onto distributed networked environments, such as public or private cloud environments. Likewise, clients of these distributed applications have an expectation of ubiquitous access to applications from a variety of different mobile or non-mobile client computers and devices. Accordingly, the information security applications for applications hosted in distributed network environments and/or cloud computing environments may be expected to protect communications originating from a wide variety of devices, unexpected/unplanned locations, or the like. As individuals and companies increasing rely on computer networks, such as the internet, for basic communication, entertainment, financial management, commerce, navigation, or the like, the impact of malicious communications, such as, denial of service attacks also increases. Large scale attacks on computer networks can now cause significant damage to companies relying on those computer networks to operate and/or communicate with their employees, suppliers, and customers. Thus, it is with respect to these considerations and others that the subject innovations have been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Description of Various Embodiments, which is to be read in association with the accompanying drawings, wherein.

DETAILED DESCRIPTION OF VARIOUS EMBODIMENTS

Figure 1:
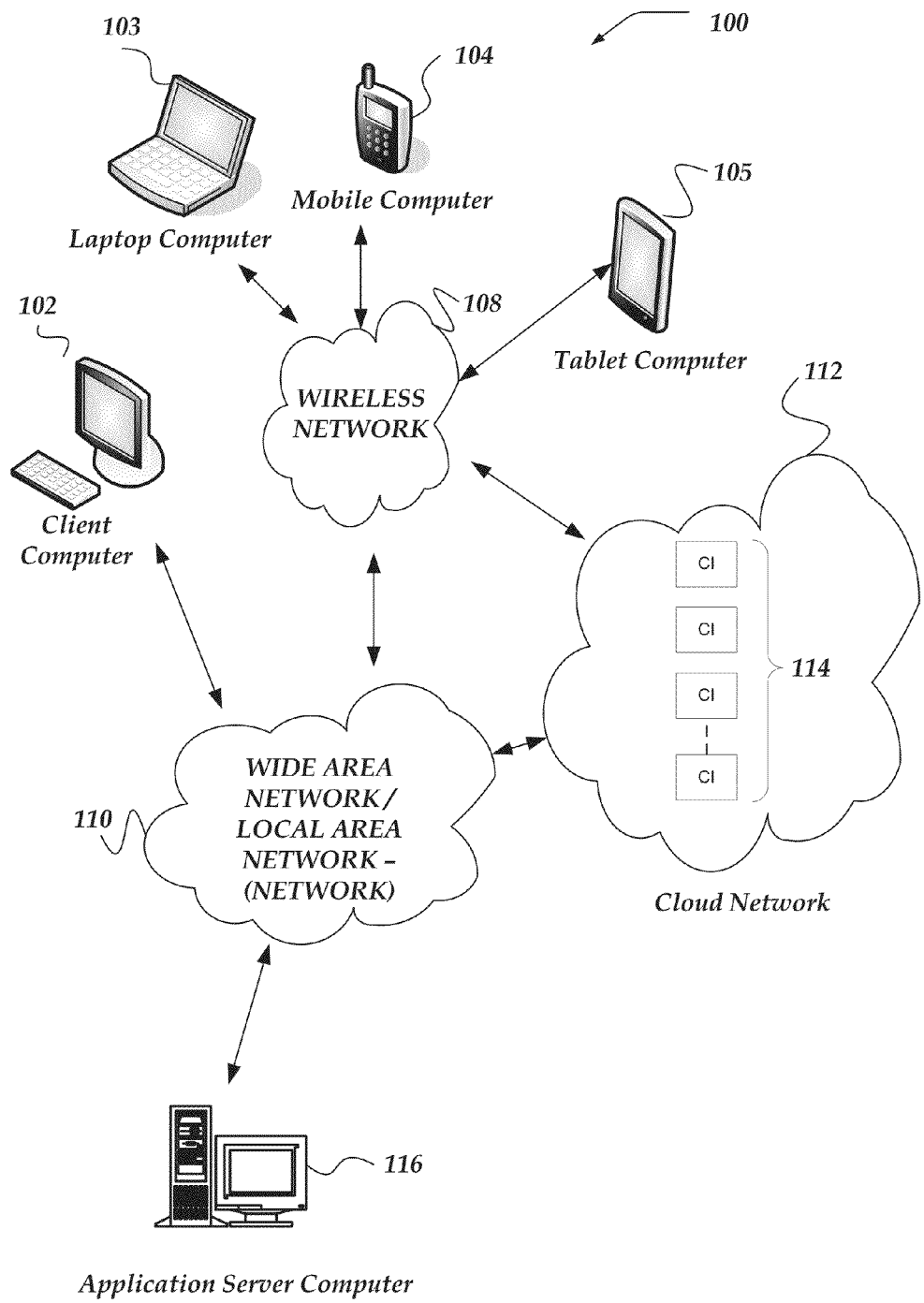
FIG. 1 is a system diagram of an environment in which embodiments of the invention may be implemented.

The present innovations now will be described more fully hereinafter with reference to the accompanying drawings, which form a part hereof, and which show, by way of illustration, specific embodiments by which the invention may be practiced. These innovations may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present innovations may be embodied as methods, computers, or devices. Accordingly, the present innovations may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "In one of the embodiments" or "in at least one of the various embodiments" as used herein does not necessarily refer to the same embodiment, though it may. Furthermore, the phrase "in another embodiment" as used herein does not necessarily refer to a different embodiment, although it may. Thus, as described below, various embodiments of the innovations may be readily combined, without departing from the scope or spirit of the innovations.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein the term "cloud network" refers to cloud based networked computing environments that usually enable location transparent access to services and/or applications. Cloud networks may be comprised of one or more physical network computers. These physical network computers may be coupled using one or more networks and/or arranged into clusters. In some cases, users may access cloud networks over public networks, such as, the internet. Cloud networks generally made available to the public are sometimes called public cloud networks. In other cases, access to a cloud network may be restricted. This type of cloud network configuration may be called a private cloud network.

Cloud networks may comprise numerous physical computers and storage devices arranged such that the number and arrangement of the physical computers and devices is hidden from the users of a cloud network. Cloud network infrastructure, the details and architecture of which may vary depending on the cloud network provider, automatically provision and deploy applications and services onto the physical hardware transparent to the users of cloud services.

As used herein the term "cloud instance" refers to an addressable (identifiable) and distinct allocation of computing resources in a cloud network. In many embodiments, cloud instances are virtual servers implemented using one or more virtual machine technologies. In some embodiments, cloud instances may be optimized for particular computing tasks.

As used herein the term "credentials" refers to information that is used for unambiguous identification of entities or items in a network. In some embodiments, cryptographic techniques may be employed to generate credentials for establishing the identity of parties that are in communication over a network, including, users, client computers, server computers, or the like. In at least one of the various embodiments, credentials may comprise machine-readable cryptographic keys, passwords, certificates, public key/private keys, or the like. In at least one of the various embodiments, credentials may be self-issued, or issued by a trusted third party. For example, an X.509 certificate and a corresponding private key is a credential that may be generated using well-known cryptographic techniques.

As used herein the term "seed file" refers to unencrypted data that is preselected for use during compression and encryption operations. Seed files include data that may be processed and used for preloading a work space buffer used during codec operations, such as, compression, cryptographic operations, or the like, or combination thereof. In at least one of the various embodiments, seed files may be selected to include data that may optimize the codec operations for a particular type of data. For example, if source data is determined to be HTML, a particular seed file may include data that improves the initial performance of codec operations performed on the source data. Seed files may be various sizes, such as, 1K-10Kbytes, or more, depending on the particular implementation.

As used herein the term "instruction set," and "instruction set information" refer to information that may be communicated from a security application server on a server computer to a client security application on a client computer. Instruction information may include a seed file identifier, an offset value, a length value, and optionally a range of port numbers. In some embodiments, the instruction set information may be employed by a security application (both client and servers) to extract a pass phrase from a seed file. The extracted pass phrase may be employed by a security application to generate a cryptographic key.

As used herein the term "hardware security module" refers to a hardware device or computer arranged for providing additional safeguards for storing and using security/cryptographic information such as, keys, digital certificates, passwords, passphrases, two-factor authentication information, personal identification numbers, or the like. In some embodiments, hardware security modules may be employed to support one or more standard public key infrastructures (PKI), and may be employed to generate, manage, and/or store keys pairs, or the like. In some embodiments, hardware security modules may be arranged and/or configured as stand-alone network computers, in other cases, they may be arranged as hardware cards that may be added to a computer. Further, in some cases, hardware security modules may be arranged as a portable computer, and/or incorporated into client computers.

As used herein the terms, "encryption," and "decryption," refer to cryptographic operations that may be performed on message data. Generally, encryption may refer to one or more cryptographic operations that may be performed on data to secure it for transmission and/or storage. In some cases, data may be encoded using public key/private key cryptography. In other cases, cryptographic operations may employ symmetric keys. Further, in some embodiments, data operations such as compression/decompression may be employed before and/or simultaneously while data is encrypted or decrypted. Accordingly, herein it is assumed that encryption, decryption, and cryptographic operations may include one or more additional steps such as compression, decompression, data padding, data seeding, or the like, or combination thereof.

As used herein the term "transport key" as used herein is a cryptographic key used for symmetric encryption that is generated by a security application based on instruction set information. The transport key is used in cryptography to encrypt and/or decrypt information communicated between two endpoints.

As used herein the term "network packet key" as used herein is a cryptographic key used for that is generated by a security application based on instruction set information. The network packet key is included in network packets that are communicated to a server computer from a client computer. In some embodiments, if the network packet key in a network packet matches the network packet key installed on a network interface of the service computer, the communicated network packet may be forwarded to the operating system of the server computer for further processing; otherwise the network packet may be discarded.

As used here the term "packet inspection engine" refers to a component that is embedded in a network interface. A packet inspection engine may be enabled to employ one or more packet rules that may be used for comparing the contents of a network packet with one or more values.

As used herein the term "packet rule" refers to a rule used in a packet inspection engine that may include at least a value and a comparison operation where the results of the comparison may determine if an incoming network packet is accepted or discarded at the network information.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards seeded cryptography and compression for data transport and storage. In at least one of the various embodiments, the client applications and server application may be installed with client security application and security application servers, respectively. The client application and server application may employ the client security application and the security application server to communicate over a network.

In at least one of the various embodiments, the client security application may register with a security application server using one or more cryptographic credentials. Upon successful registration the client security application and security application server may conduct cryptographically secure communication over the network.

In at least one of the various embodiments, at the beginning of each secure cryptographic communication session the client security application and the security application server may exchange instruction sets that are used to generate an initial transport key that may enable the two security applications to conduct secure communications. In at least one of the various embodiments, the instruction set information may at least include information for determining a pass phrase from one or more preinstalled seed files, copies of which are present on each security application (e.g. both the client and server).

In at least one of the various embodiments, during cryptographic operations a workspace memory may be filled deliberately and/or as a by-product of a compression operation. Accordingly, the information in the workspace may be employed to generate a new transport key for encrypting (or decrypting) the next portion of the data.

In at least one of the various embodiments, data that is encrypted for storage (e.g., as a file or in a database) may be bundled with an encrypted copy of the instruction set that was used to generate the initial transport key used for encrypting the data. Accordingly, if the encrypted bundle is retrieved from storage, the original initial transport key may be regenerated from the instruction set information that was bundled with the stored encrypted data.

In at least one of the various embodiments, embodiments may be directed to manage communicating over a network by performing transparent denial of service protection. In at least one of the various embodiments, instruction set information that references at least a seed file that is installed may be generated to produce a network packet key. In at least one of the various embodiments, a copy of this instruction set information may be communicated to a client computer.

In at least one of the various embodiments, a network packet key may be generated based on the instruction set information.

In at least one of the various embodiments, a client computer may generate a client network packet key based on the instruction set information that was provided by the network computer and at least another seed file that may be installed on the client computer.

In at least one of the various embodiments, the client network packet key may be encrypted using a public key of the server and communicated to the server computer along with the encrypted data.

The same instruction set as the network computer may be used by the client computer to ensure that the client network packet key and the network packet key have the same value. Then the client computer may include the client network packet key the one or more network packets that it is sending to the network computer before they are provided to the network computer.

In at least one of the various embodiments, the instruction sets used by the client computer and the server computer may include information to generate two or more network packet keys. For example, the instruction set may include information for generating a separate network packet key used for encrypting data sent by the server computer and a separate network packet key used for encrypting data sent by the client computer.

In at least one of the various embodiments, generating the network packet key may include determining which seed file to use based on an identifier included in the instruction set information; extracting a pass phrase from the seed file based on an offset value and a pass phrase length value included in the instruction set information; and generating the network packet key based on the pass phrase that is extracted from the seed file.

In at least one of the various embodiments, a packet rule that includes the network packet key may be generated and the packet rule may be installed in a packet inspection engine that is included in a hardware network interface.

In at least one of the various embodiments, if one or more network packets are communicated to the network computer, the packet inspection engine may perform further actions, including: comparing the network packet key to the one or more network packets using the packet rule; and accepting each of the one or more network packets that include the network packet key and discarding each of the one or more network packets that omit the network packet key, wherein the accepted one or more network packets are provided to the operating system of the network computer.

In at least one of the various embodiments, if the one or more network packets are encrypted by the client computer, the encrypted network packets may be decrypted by the network computer before comparing the network packet key to the one or more network packets using the packet rule.

Illustrative Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)–(network) 110, wireless network 108, one or more cloud networks, such as, cloud network 112, one or more cloud instances, such as cloud instances 114, client computers 102-105, and Application Server Computer 116.

At least one embodiment of client computers 102-105 is described in more detail below in conjunction with FIG. 2. In one embodiment, at least some of client computers 102-105 may operate over one or more wired and/or wireless networks, such as networks 108, 110, and/or 112. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, kiosk, point-of-sale, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), JavaScript Object Notation (JSON), or the like, to display and send a message. In one embodiment, a user of the client computer may employ the browser application to perform various activities over a network (online). However, one or more other applications may also be used to perform various online activities.

Client computers 102-105 also may include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), media access control address (MAC address), an electronic serial number (ESN), operating system generated hardware identifier, or other device identifier. Such information may be provided in a network packet, or the like, sent between other client computers, application server computer 116, or other computers.

Client computers 102-105 may further be configured to include a client application that enables an end-user to log into an end-user account that may be managed by another computer, such as application server computer 116, cloud instances 114, or the like. Such an end-user account, in one non-limiting example, may be configured to enable the end-user to manage one or more online activities, including in one non-limiting example, search activities, social networking activities, browse various websites, communicate with other users, perform one or more financial activities, online banking, online investment management, or the like. However, participation in such online activities may also be performed without logging into the end-user account.

Wireless network 108 is configured to couple client computers 103-105 and its components with network 110 and/or cloud network 112. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, cloud network, cloud instance, or the like.

Network 110 is configured to couple network computers with other computers, including, application server computer 116, client computers 102-105 through wireless network 108, cloud network 112, cloud instances 114, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Cloud network 112 may be a public or private cloud network. Cloud network 112 may comprise multiple physical network computers, interconnected by one or more networks, such as, networks similar to and/or including network 108 and/or wireless network 110. Cloud network 112 may enable and/or provide one or more cloud instances. For example, cloud instances 114 may be operative in cloud network 112. The number and composition of cloud instances 114 may be vary depending on the demands of individual users, cloud network arrangement, operational loads, performance considerations, application needs, operational policy, or the like. In at least one of the various embodiments, cloud network 112 may be arranged as a hybrid network that includes a combination of private hardware resources, private cloud resources, public cloud resources, or the like.

Cloud instances 114 may be virtualized embodiments of network computer 300. Further, one or more cloud instances 114 may be operative on physical network computers, such as network computer 300. Cloud instances that may be operative on a network computer, such as, network computer 300 may be managed by a hypervisor, such as hypervisor 319. Further, cloud instances 114 may be arranged to use various computer operating systems. And, cloud instances running different computer operating systems may be operative in the same cloud network.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of application server computer 116 is described in more detail below in conjunction with FIG. 3. Briefly, however, application server computer 116 includes virtually any network computer capable of managing the running one or more provider applications and/or security application, compressing application, databases, or the like, or combination thereof.

Although FIG. 1 illustrates application server computer 116 as a single computer, the innovations and/or embodiments are not so limited. For example, one or more functions of application server computer 116 may be distributed across one or more distinct network computers. Moreover, application server computer 116 is not limited to a particular configuration. Thus, in one embodiment, application server computer 116 may be implemented using a plurality of network computers. In other embodiments, the application server computer 116 may operate as a plurality of network computers within a cluster architecture, a peer-to-peer architecture, or the like. Further, in at least one of the various embodiments, one or more application server computers may be implemented using one or more cloud instances in one or more cloud networks. Accordingly, these innovations and embodiments are not to be construed as being limited to a single environment, and other configurations, and architectures are also envisaged.

Illustrative Client Computer

Figure 2:
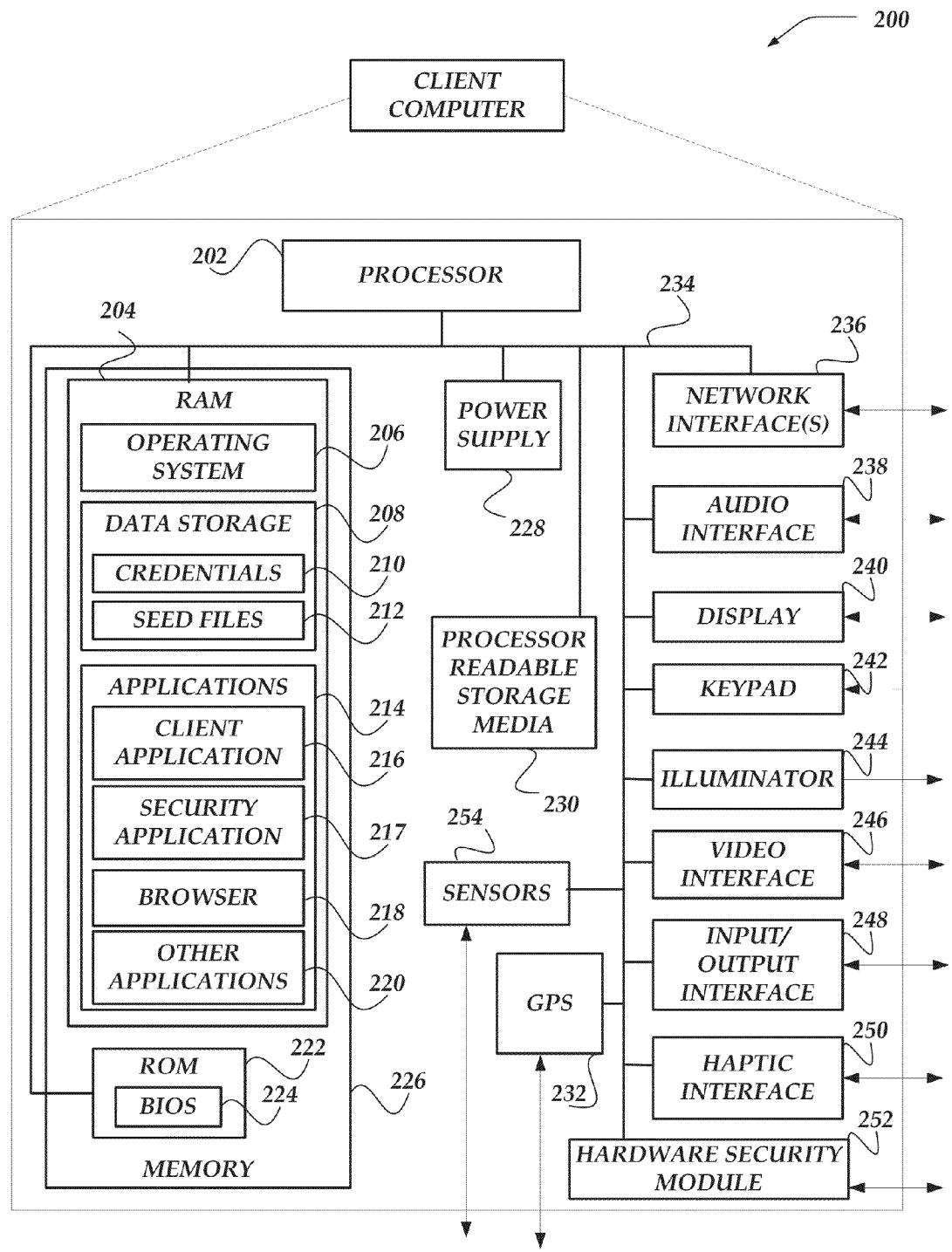
FIG. 2 shows an embodiment of a client computer that may be included in a system such as that shown in FIG. 1.

FIG. 2 shows one embodiment of client computer 200 that may be included in a system in accordance with at least one of the various embodiments. Client computer 200 may include many more or less components than those shown in FIG. 2. However, the components shown are sufficient to disclose an illustrative embodiment for practicing the present invention. Client computer 200 may represent, for example, one embodiment of at least one of client computers 102-105 of FIG. 1.

As shown in the figure, client computer 200 includes a processor 202 in communication with a mass memory 226 via a bus 234. In some embodiments, processor 202 may include one or more central processing units (CPU). Client computer 200 also includes a power supply 228, one or more network interfaces 236, an audio interface 238, a display 240, a keypad 242, an illuminator 244, a video interface 246, an input/output interface 248, a haptic interface 250. In some embodiments, a client computer may include components such as hardware security module 252, or a global positioning system (GPS) receiver 232.

Power supply 228 provides power to client computer 200. A rechargeable or non-rechargeable battery may be used to provide power. The power may also be provided by an external power source, such as an alternating current (AC) adapter or a powered docking cradle that supplements and/or recharges a battery.

Client computer 200 may optionally communicate with a base station (not shown), or directly with another computer. Network interface 236 includes circuitry for coupling client computer 200 to one or more networks, and is constructed for use with one or more communication protocols and technologies including, but not limited to, GSM, CDMA, TDMA, GPRS, EDGE, WCDMA, HSDPA, LTE, user datagram protocol (UDP), transmission control protocol/Internet protocol (TCP/IP), short message service (SMS), WAP, ultra wide band (UWB), IEEE 802.16 Worldwide Interoperability for Microwave Access (WiMax), session initiated protocol/real-time transport protocol (SIP/RTP), or any of a variety of other wireless communication protocols. Network interface 236 is sometimes known as a transceiver, transceiving device, or network interface card (NIC).

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display (LCD), gas plasma, light emitting diode (LED), organic LED, or any other type of display used with a computer. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client computer is powered. Also, illuminator 244 may backlight these buttons in various patterns when particular actions are performed, such as dialing another client computer. Illuminator 244 may also cause light sources positioned within a transparent or translucent case of the client computer to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor (CMOS) integrated circuit, charge-coupled device (CCD), or any other integrated circuit for sensing light.

Client computer 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Haptic interface 250 is arranged to provide tactile feedback to a user of the client computer. For example, the haptic interface 250 may be employed to vibrate client computer 200 in a particular way when another user of a computer is calling. In some embodiments, haptic interface 250 may be optional.

Client computer 200 may also include GPS transceiver 232 to determine the physical coordinates of client computer 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 232 can determine a physical location within millimeters for client computer 200; and in other cases, the determined physical location may be less precise, such as within a meter or significantly greater distances. In one embodiment, however, client computer 200 may through other components, provide other information that may be employed to determine a physical location of the computer, including for example, a Media Access Control (MAC) address, IP address, or the like.

Further, client computer 200 may also comprise hardware security module (HSM) 252 for providing additional safeguards for generating, storing and/or using security/cryptographic information such as, keys, digital certificates, passwords, passphrases, two-factor authentication information, cryptographic hashing, or the like. In some embodiments, hardware security module may be employed to support one or more standard public key infrastructures (PKI), and may be employed to generate, manage, and/or store public/private key pairs, or the like. In some embodiments, HSM 252 may be a stand-alone client computer, in other cases, HSM 252 may be arranged as a hardware card that may be added to a client computer. In some embodiments, HSM 252 may be arranged to provide hardware accelerated cryptography and/or compression of data.

Client computer 200 may also include sensors 254 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors 254 may be one or more hardware sensors that collect and/or measure data that is external to client computer 200.

Mass memory 226 includes a Random Access Memory (RAM) 204, a Read-only Memory (ROM) 222, and other storage means. Mass memory 226 illustrates an example of computer readable storage media (devices) for storage of information such as computer readable instructions, data structures, program modules or other data. Mass memory 226 stores a basic input/output system (BIOS) 224, or the like, for controlling low-level operation of client computer 200. The mass memory also stores an operating system 206 for controlling the operation of client computer 200. It will be appreciated that this component may include a general-purpose operating system such as a version of UNIX, or LINUX™, or a specialized client communication operating system such as Microsoft Corporation's Windows Mobile™, Apple Corporation's iOS™, Google Corporation's Android™ or the Symbian® operating system, or the like. The operating system may include, or interface with a Java virtual machine module, or the like, that enables control of hardware components and/or operating system operations via application programs.

Mass memory 226 further includes one or more data storage 208, which can be utilized by client computer 200 to store, among other things, applications 214 and/or other data. For example, data storage 208 may also be employed to store information that describes various capabilities of client computer 200. The information may then be provided to another computer based on any of a variety of events, including being sent as part of a header during a communication, sent upon request, or the like. Data storage 208 may also be employed to store social networking information including address books, buddy lists, aliases, user profile information, or the like. Further, data storage 208 may also store messages, web page content, or any of a variety of user generated content. Further, data storage 208 may be used for storing credentials 210 that may be employed for cryptography operations. Also, data storage may employed for storing seed files 212 that may be employed for operations related to cryptography, compression, or the like, or combination thereof.

At least a portion of the information stored in data storage 208 may also be stored on another component of client computer 200, including, but not limited to processor readable storage media 230, a disk drive or other computer readable storage devices (not shown) within client computer 200.

Processor readable storage media 230 may include volatile, non-transitory, non-transitive, nonvolatile, removable, and non-removable media implemented in any method or technology for storage of information, such as computer or processor-readable instructions, data structures, program modules, or other data. Examples of computer readable storage media include RAM, ROM, Electrically Erasable Programmable Read-only Memory (EEPROM), flash memory or other memory technology, Compact Disc Read-only Memory (CD-ROM), digital versatile disks (DVD) or other optical storage, solid state drives (SSD), magnetic cassettes, magnetic tape, magnetic disk storage or other magnetic storage devices, or any other physical medium which can be used to store the desired information and which can be accessed by a computer. Processor readable storage media 230 may also be referred to herein as computer readable storage media and/or computer readable storage device.

Applications 214 may include computer executable instructions which, when executed by client computer 200, transmit, receive, and/or otherwise process network data. Network data may include, but is not limited to, messages (e.g. SMS, Multimedia Message Service (MMS), instant message (IM), email, and/or other messages), audio, video, and enable telecommunication with another user of another client computer. Applications 214 may include, for example, client application 216, client security application 217, a browser 218, and other applications 220.

Browser 218 may include virtually any application configured to receive and display graphics, text, multimedia, messages, and the like, employing virtually any web based language. In one embodiment, the browser application is enabled to employ HDML, WML, WMLScript, JavaScript, SGML, HTML, HTML5, XML, and the like, to display and send a message. However, any of a variety of other web-based programming languages may be employed. In one embodiment, browser 218 may enable a user of client computer 200 to communicate with another network computer, such as application server computer 116 shown in FIG. 1.

Other applications 220 may include, but are not limited to, calendars, search programs, email clients, IM applications, SMS applications, voice over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Network Computer

Figure 3:
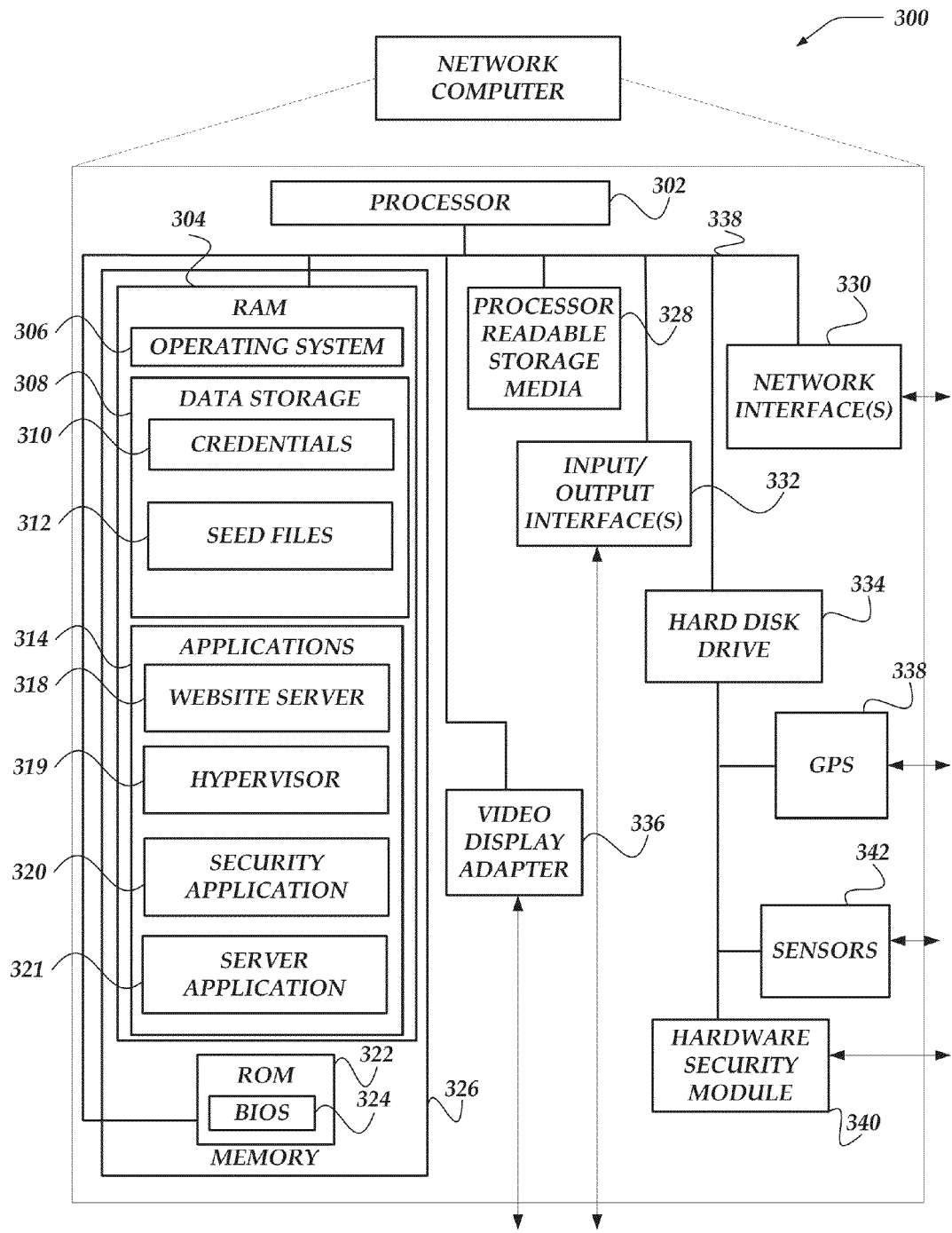
FIG. 3 shows an embodiment of a network computer that may be included in a system such as that shown in FIG. 1.

FIG. 3 shows one embodiment of a network computer 300, according to one embodiment of the invention. Network computer 300 may include many more or less components than those shown. The components shown, however, are sufficient to disclose an illustrative embodiment for practicing the invention. Network computer 300 may be configured to operate as a server, client, peer, a host, cloud instance, or any other computer. Network computer 300 may represent, for example application server computer 116, and/or other network computers.

Network computer 300 may include processor 302, processor readable storage media 328, network interface unit 330, an input/output interface 332, hard disk drive 334, hardware security module 340, video display adapter 336, and memory 326, all in communication with each other via bus 338. In some embodiments, processor 302 may include one or more central processing units. In at least one of the various embodiments, network computer 300 may include global positioning system (GPS) receiver 338.

As illustrated in FIG. 3, network computer 300 also can communicate with the Internet, or other communication networks, via network interface unit 330, which is constructed for use with various communication protocols including the TCP/IP protocol. Network interface unit 330 is sometimes known as a transceiver, transceiving device, or network interface card (NIC).

Network computer 300 also comprises input/output interface 332 for communicating with external devices, such as a keyboard, or other input or output devices not shown in FIG. 3. Input/output interface 332 can utilize one or more communication technologies, such as USB, infrared, NFC, Bluetooth™, or the like.

Network computer 300 may also include GPS transceiver 338 to determine the physical coordinates of network computer 300 on the surface of the Earth. GPS transceiver 338, in some embodiments, may be optional. GPS transceiver 338 typically outputs a location as latitude and longitude values. However, GPS transceiver 338 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 338 can determine a physical location within millimeters for network computer 300; and in other cases, the determined physical location may be less precise, such as within a meter or significantly greater distances. In one embodiment, however, network computer 300 may through other components, provide other information that may be employed to determine a physical location of the computer, including for example, a Media Access Control (MAC) address, IP address, or the like.

Further, network computer 300 may also comprise hardware security module (HSM) 340 for providing additional safeguards for generating, storing and/or using security/cryptographic information such as, keys, digital certificates, passwords, passphrases, two-factor authentication information, personal identification numbers, or the like. In some embodiments, hardware security module may be employed to support one or more standard public key infrastructures (PKI), and may be employed to generate, manage, and/or store keys pairs, or the like. In some embodiments, HSM 340 may be a stand-alone network computer, in other cases, HSM 340 may be arranged as a hardware card that may be added to a network computer. In some embodiments, HSM 252 may be arranged to provide hardware accelerated cryptography and/or compression of data.

Network computer 300 may also include sensors 342 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors 342 may be one or more hardware sensors that collect and/or measure data that is external to network computer 300.

Memory 326 generally includes RAM 304, ROM 322 and one or more permanent mass storage devices, such as hard disk drive 334, tape drives, solid state drives, optical drives, and/or floppy disk drives. Memory 326 stores operating system 306 for controlling the operation of network computer 300. Any general-purpose operating system may be employed. Basic input/output system (BIOS) 324 is also provided for controlling the low-level operation of network computer 300.

Although illustrated separately, memory 326 may include processor readable storage media 328. Processor readable storage media 328 may be referred to and/or include computer readable media, computer readable storage media, and/ or processor readable storage device. Processor readable storage media 328 may include volatile, nonvolatile, non-transitory, non-transitive, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, thumb drives, memory cards, or any other media which can be used to store the desired information and which can be accessed by a computer.

Memory 326 further includes one or more data storage 308, which can be utilized by network computer 300 to store, among other things, applications 314 and/or other data. For example, data storage 308 may also be employed to store information that describes various capabilities of network computer 300. The information may then be provided to another computer based on any of a variety of events, including being sent as part of a header during a communication, sent upon request, or the like. Data storage 308 may also be employed to store messages, web page content, or the like. At least a portion of the information may also be stored on another component of network computer 300, including, but not limited to processor readable storage media 328, hard disk drive 334, or other computer readable storage medias (not shown) within network computer 300.

Data storage 308 may include a database, text, spreadsheet, folder, file, or the like, that may be configured to maintain and store user account identifiers, user profiles, email addresses, IM addresses, and/or other network addresses; or the like. Data storage 308 may further include program code, data, algorithms, and the like, for use by a processor, such as processor 302 to execute and perform actions. In one embodiment, at least some of data store 308 might also be stored on another component of network computer 300, including, but not limited to processor-readable storage media 328, hard disk drive 334, or the like.

Data storage 308 may be used for storing credentials 310 that may be employed for cryptography operations. Also, data storage 308 may employed for storing seed files 312 that may be employed for operations related to cryptography, compression, or the like, or combination thereof.

Applications 314 may include computer executable instructions, which may be loaded into mass memory and run on operating system 306. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Applications 314 may also include website server 318, hypervisor 319, security application 320, or server application 321.

Website server 318 may represent any of a variety of information and services that are configured to provide content, including messages, over a network to another computer. Thus, website server 318 can include, for example, a web server, a File Transfer Protocol (FTP) server, a database server, a content server, email server, or the like. Website server 318 may provide the content including messages over the network using any of a variety of formats including, but not limited to WAP, HDML, WML, SGML, HTML, HTML5, XML, Compact HTML (cHTML), Extensible HTML (xHTML), or the like.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Logical System

Figure 4:
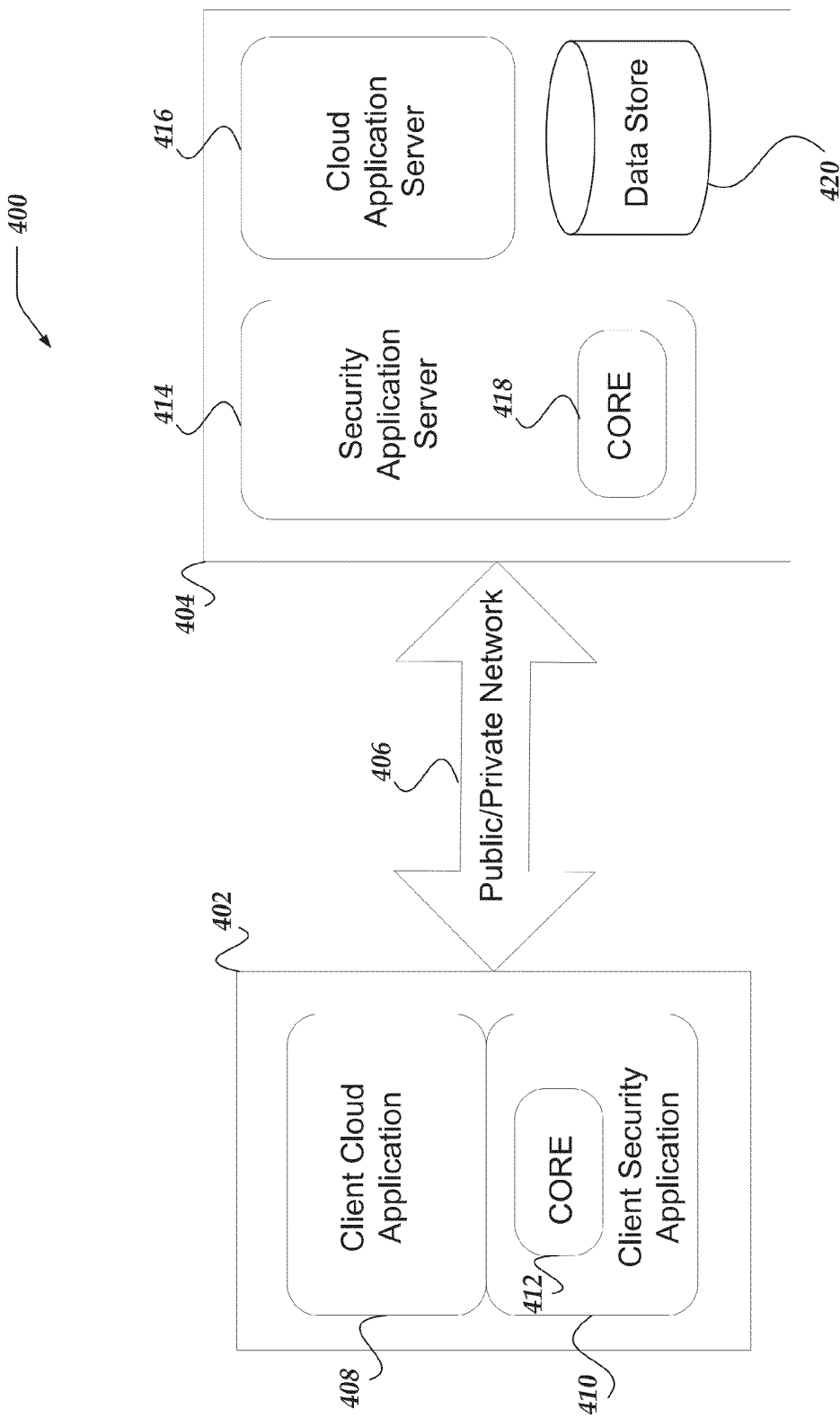
FIG. 4 shows an overview of architecture of a secure networking system in accordance with at least one of the various embodiments.

FIG. 4 shows an overview of architecture for of secure networking system 400 in accordance with at least one of the various embodiments. System 400 includes client computer 402 that may be in communication with application server computer 404 over network 406.

In at least one of the various embodiments, client computer 402 may be a client computer, such as, client computer 200. Likewise, in at least one of the various embodiments, application server computer 404 may be a network computer, such as, network computer 300. Further, in at least one of the various embodiments, network 406, may be a network such as, wireless network 108, network 110, cloud network 112, or the like, or combination thereof.

In at least one of the various embodiments, client computer 402 may include client cloud application 408 that may be logically coupled with client security application 410. Further, client security application may include one or more components, such as, core 412. In at least one of the various embodiments, core 412 may be arranged to include one or more hardware and/or software cryptography components. In some embodiments, such components may be arranged to generate cryptographic credentials and/or credential information, such as, public/private key pairs, cryptographic certificates, or the like. Also, in at least one of the various embodiments, core 412 may be arranged to perform actions such as encryption, cryptographic hashing, cryptographic signing, key generation, compression, or the like, or combination thereof. In some embodiments, core 412 may be partly or fully implemented as a hardware security modules, such as, HSM 252.

Similarly, in at least one of the various embodiments, application server computer 404 may include security application server 414, and cloud application server 416. Similar to client security application, security application server 414 may include one or more components, such as, core 418. In at least one of the various embodiments, core 418 may be partly or fully implements as a hardware security module, such as, HSM 340. Further, in some embodiments, server computer 404 may include one or more data storage systems, such as, data store 420. In some embodiments, data store 420 may be a file system, distributed file system, database, or the like, or combination thereof. Further, in some embodiments, data store 420 may reside on one or more network computers and/or storage computers that are separate from server computer 404.

In at least one of the various embodiments, client security application 410 may be statically or dynamically coupled with client cloud application 408. In some embodiments, client security application 410 may be built-in to client cloud applications. In other embodiments, client cloud application 408 may be arranged to logically couple with client security application 410 through an API, or the like. For example, communication between client cloud applications and client security applications may be performed using one or more inter-process communication mechanism that may be supported by the client computer.

In at least one of the various embodiments, client cloud application 408 may transparently employ client security application 410 to securely (cryptographically secure) communicate with a cloud application server, such as, cloud application server 416. Likewise, in at least one of the various embodiments, cloud application server 416 may be arranged to employ security application server 418 to cryptographically secure communications between itself and client cloud applications, such as, client cloud application 408.

In at least one of the various embodiments, client security application 410 may be embedded with credential information that is associated with the entity that owns the server cloud application. For example, a financial service company may arrange its client security applications to include particular public key credentials that correspond to one or more particular security application servers. Also, in at least one of the various embodiments, the cloud security application and/or the server security application may be arranged include other predefined identifiers for associating one or more client security applications with one or more particular security application servers. In at least one of the various embodiments, seed files, client identifiers, entity identifiers, platform identifiers, or the like, may be preinstalled (e.g., built-in) client security applications, such as, client security application 410.

In at least one of the various embodiments, a user may download and install client security applications from restricted access application portals that are associated with a particular entity (e.g., an enterprise app store for a financial services company). Accordingly, an entity may rely on the security features of the restricted access application download portal to ensure that the users of client security applications (e.g., those that include credentials associated with the owning entity) are authorized users.

In at least one of the various embodiments, client security applications may be arranged to enable users to download and/or update the credential information from a source that is different than the application download portal. For example, the client security application may be made publically available (e.g., on a public app store) with the credentials provided later from a restricted/secure source.

In at least one of the various embodiments, before a client security application may be enabled for secure communication it may be registered with the one or more security application servers. In at least one of the various embodiments, client security applications and security application servers may be arranged to employ a defined handshake protocol to exchange credential information, at least one embodiment of which is described below. In at least one of the various embodiments, client security applications and security application servers may then generate transport keys to employ for communication of secure data with a security application server they may be registered with.

In at least one of the various embodiments, this arrangement at least enables client security applications and security application servers to conduct secure communication without the need to exchange keys and/or the intervention of trusted third-parties.

Figure 5A:
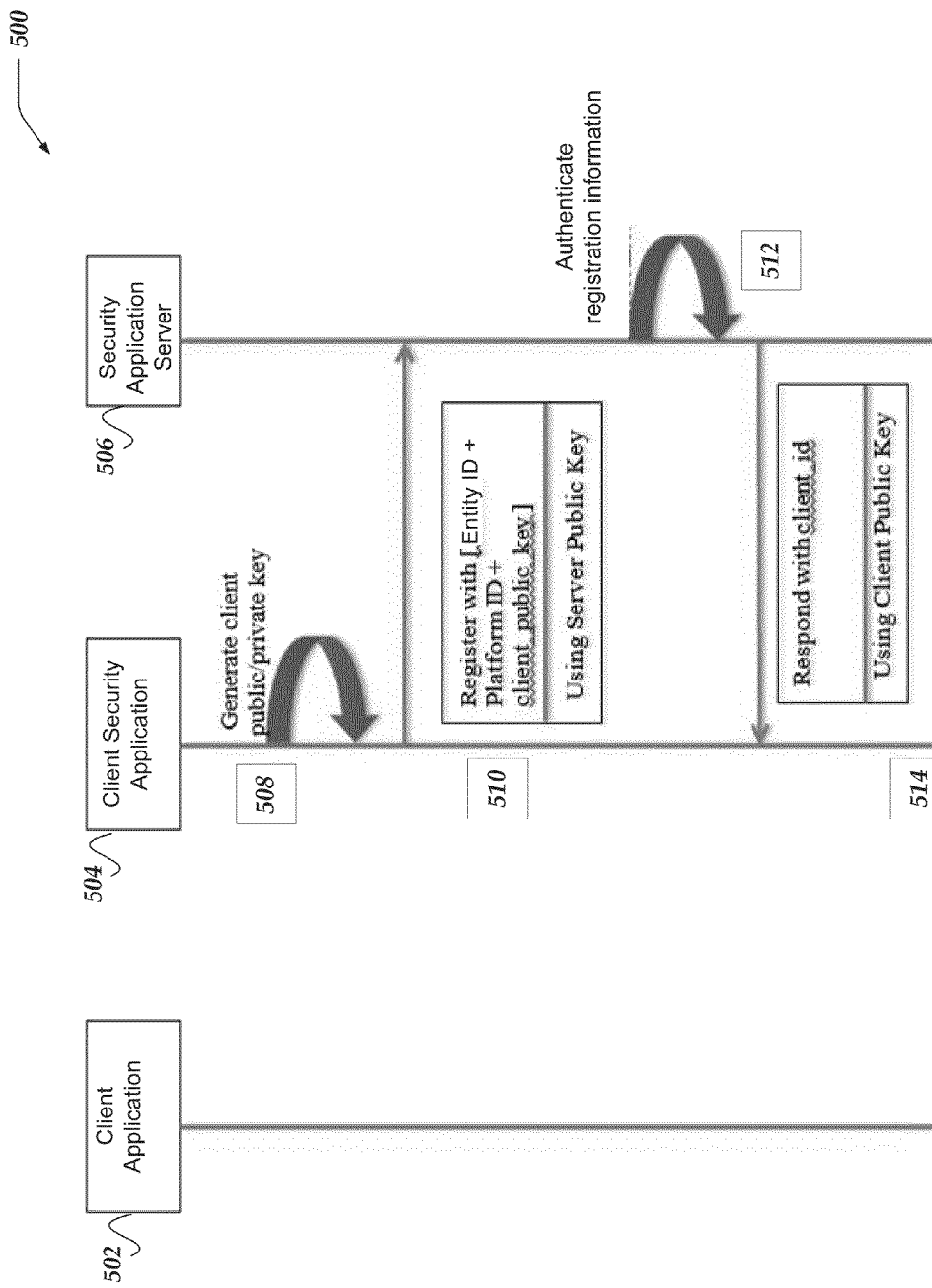
FIGS. 5A-5B show registration processes employed by a system in accordance with at least one of the various embodiments.

FIG. 5A shows a registration process employed by system 500 that is in accordance with at least one of the various embodiments. In at least one of the various embodiments, client security applications, and security application servers may be arranged to perform various communication steps to register a client security application with a security application server. In this example, system 500 comprises, client application 502, client security application 504, and security application server 506 that may be in communication over a network.

In at least one of the various embodiments, at step 508, client security application 508 may generate a client public key/private key pair. In at least one of the various embodiments, client security application 504 may be arranged to include facilities (e.g., core 412) that may be employed to generate cryptographic credentials such as public key/private key pairs. One of ordinary skill in the art will appreciate that there are multiple ways to generate public/private keys to implement public-key cryptography. The any cryptographic secure public key cryptography protocols/infrastructures may be employed without departing from the scope of these innovations.

At step 510, in at least one of the various embodiments, client security application 504 may generate a registration information bundle that at least includes credential information to employ to register with security application server 506. In at least one of the various embodiments, credential information may include an entity identifier (entity ID), a platform identifier (platform ID), the public key generated by client security application 504, or the like, or combination thereof. In at least one of the various embodiments, the combination of the entity ID, and the platform ID may be considered together as a client identifier (client ID).

In at least one of the various embodiments, the entity ID may be an identifier that corresponds to the entity associated with services/applications the user is trying to access. For example, the entity ID may correspond to a particular financial services company that requires secure communication between its client applications and server applications. In at least one of the various embodiments, the entity ID may be employed to enable security application servers to determine if the client security application is associated with an authorized entity. In at least one of the various embodiments, entity ID values and mapping to entities may be configured for each security application server and/or client security application.

In at least one of the various embodiments, platform ID may be an identifier that corresponds to the client computer the client security application is running on. For example, if a user is employing a mobile computer (e.g., a smart phone) the platform ID may be a platform dependent identifier that may be employed to identify the particular mobile computer being using. In some embodiments, the particular structure and method of acquisition of the platform ID may vary depending on the features of the client computer. In the interest of brevity the various techniques are not detailed herein. However, one of ordinary skill in the art will be able to arrange the client security application to determine how to obtain a suitable platform ID particular to the make, manufacture, operating system, or the like, of the particular client computer that is being employed.

In at least one of the various embodiments, the client public key included in the registration information bundler may be the public key that is generated at step 508.

In at least one of the various embodiments, the plain-text (unencrypted) format of the registration information bundle will be known to the client security application and the security application server. In some embodiments, the registration information bundle may include a version number to indicate a particular format that may be employed for a bundle.

In at least one of the various embodiments, before communicating the registration information to the security application server, the client security application may encrypt the information using the public key of the security application server. In at least one of the various embodiments, the public key of the security application server may be embedded in the client security application before it is installed on the client computer. Or, in some embodiments, it may have been provided from another source.

At step 512, in at least one of the various embodiments, the security application server may decrypt the registration information bundle using its private key. Accordingly, if the public key used by the client security application to encrypt the registration information bundle corresponds to the security application server, the entity ID may be extracted and employed to confirm that the client security application is associated with the entity. Alternatively, if the entity ID is incorrect, the security application server may disregard the registration request.

In at least one of the various embodiments, if the registration information is authenticated by the security application server, the server may generate a response information bundle that includes the client ID that was sent by client security application 504 in step 510. In at least one of the various embodiments, before providing the response information bundle to client security application 504, the information may be encrypted using client security application 504's public key that was provided in the registration information bundle at step 510.

At step 514, in at least one of the various embodiments, client security application 504 may decrypt the response information bundle using its private key and confirm that the client ID information sent in step 512 is the correct value. In at least one of the various embodiments, if the client ID (e.g., entity ID+platform ID) is authenticated by client security application 504, the client security application may consider itself as successfully registered with security application server 506. Accordingly, in at least one of the various embodiments, secure communication sessions may be established between client security application 504 and security application service 506.

In at least one of the various embodiments, client application 502 may not be a direct participant in the registration protocol described above, however, client application 502 may have initiated the registration process during an install, startup, and/or configuration process. Or, in some embodiments, upon a user logging in or otherwise authenticating herself with the client application, or the like, may initiate a registration process.

Figure 5B:
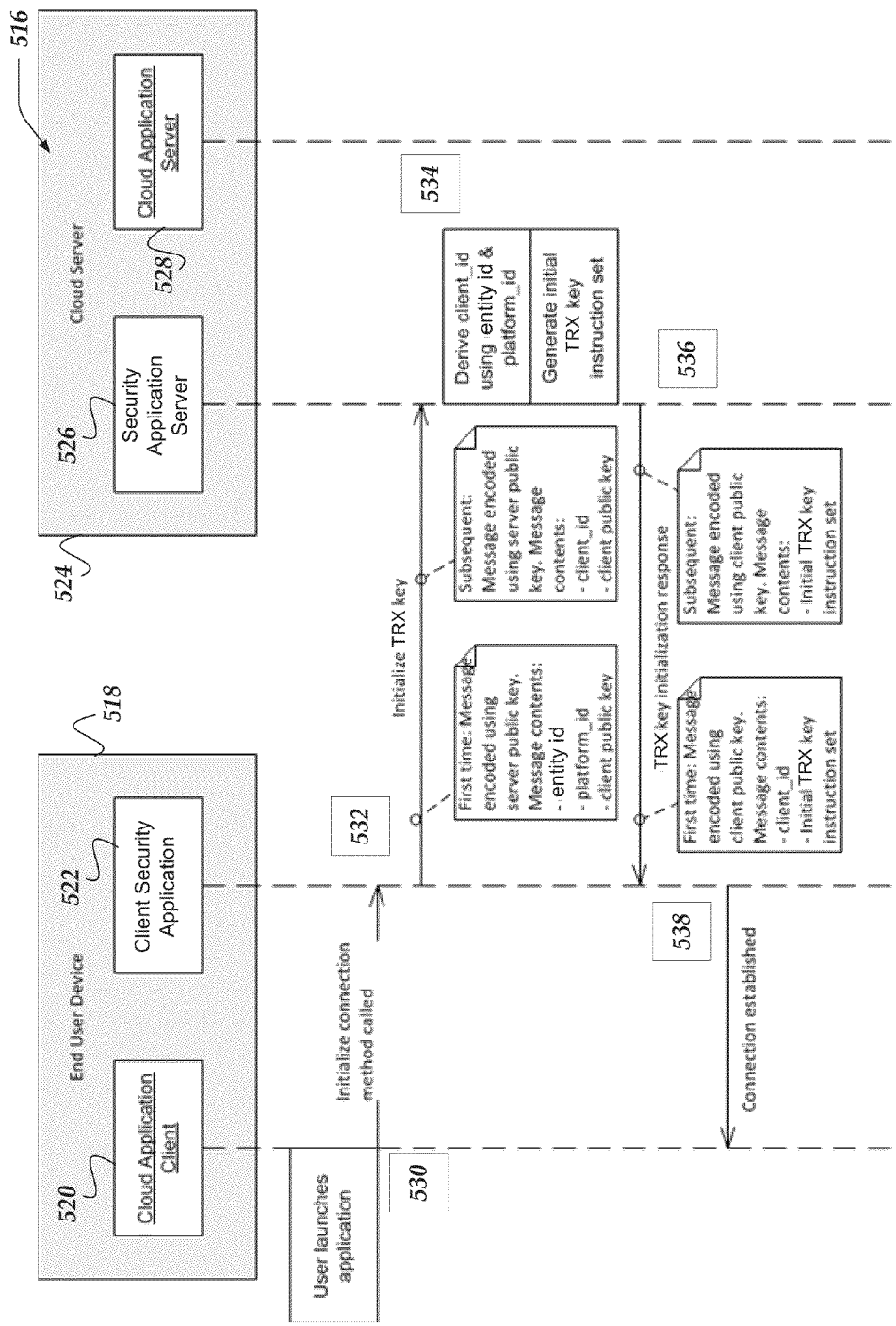

FIG. 5B shows a registration process employed by system 516 that is in accordance with at least one of the various embodiments. In at least one of the various embodiments, client security applications, and security application servers may be arranged to perform various communication steps to register a client security application with a security application server. In this example, system 516 comprises, end user client device 518 that include cloud application client 520, and client security application 522. Also, in this example, system 516 comprises cloud server 524 that includes security application server 526 and cloud application server 528. In at least one of the various embodiments, end user device 518 may be in communication with cloud server 524 over a network, such as network 108, network 110, cloud network 112, or the like, or combination thereof.

At step 530, in at least one of the various embodiments, cloud client application 520 may begin executing. In some embodiments, cloud client application 520 may start up automatically if end user device 518 boots up. In other embodiments, cloud client application 520 may be begin executing based on a user's input and/or action. In at least one of the various embodiments, cloud client application 520 may be arranged to communicate to client security application 522 to initiate a registration process. In at least one of the various embodiments, communication between cloud application client 520 and client security application 522 may be performed using a library function call, inter-process communication, or the like, or combination thereof.

At step 532, in at least one of the various embodiments, client security application 522 may initiate a request to security application server 526 for initializing a transport key (trx key). In at least one of the various embodiments, the first time a connection is established, the message may include information such as, entity ID, platform ID, client public key, or the like. In at least one of the various embodiments, the message may be encrypted using a public key that corresponds to security application server 526. In at least one of the various embodiments, for subsequent initialization requests, since a client ID may be available, the message bundle may include the client ID and client public key.

At step 534, in at least one of the various embodiments, if security application server 526 is provided the message bundle from step 532, it may be decrypted using the server private key that corresponds to the server public key employed by client security application 522 to encrypt the message bundle. In at least one of the various embodiments, if this is the first initialization and/or a the client ID is not included in the message bundle, a client ID may be generated using the entity ID and platform ID included in the bundle. In at least one of the various embodiments, the client ID may be generated by concatenating the entity ID and the platform ID. In some embodiments, additional value may be included, such as, region codes, time stamps, or the like. Further, in at least one of the various embodiments, the client ID may be generated by cryptographically hashing the information used for the client ID. In at least one of the various embodiments, the generated client ID may be stored as a key/index value for subsequent identification of end user device 518, cloud application client 520, client security application 522, or the like, or combination thereof. In at least one of the various embodiments, if the client ID is determined and/or generated, security application server 526 may generate a transport key (trx key) initial instruction set.

At step 536, in at least one of the various embodiments, security application server 526 may encode the message bundle generate at step 534 using the client public key that is provided at step 532. Accordingly, in at least one of the various embodiments, the encrypted message bundle may be provided to client security application 522.

Figure 6A:
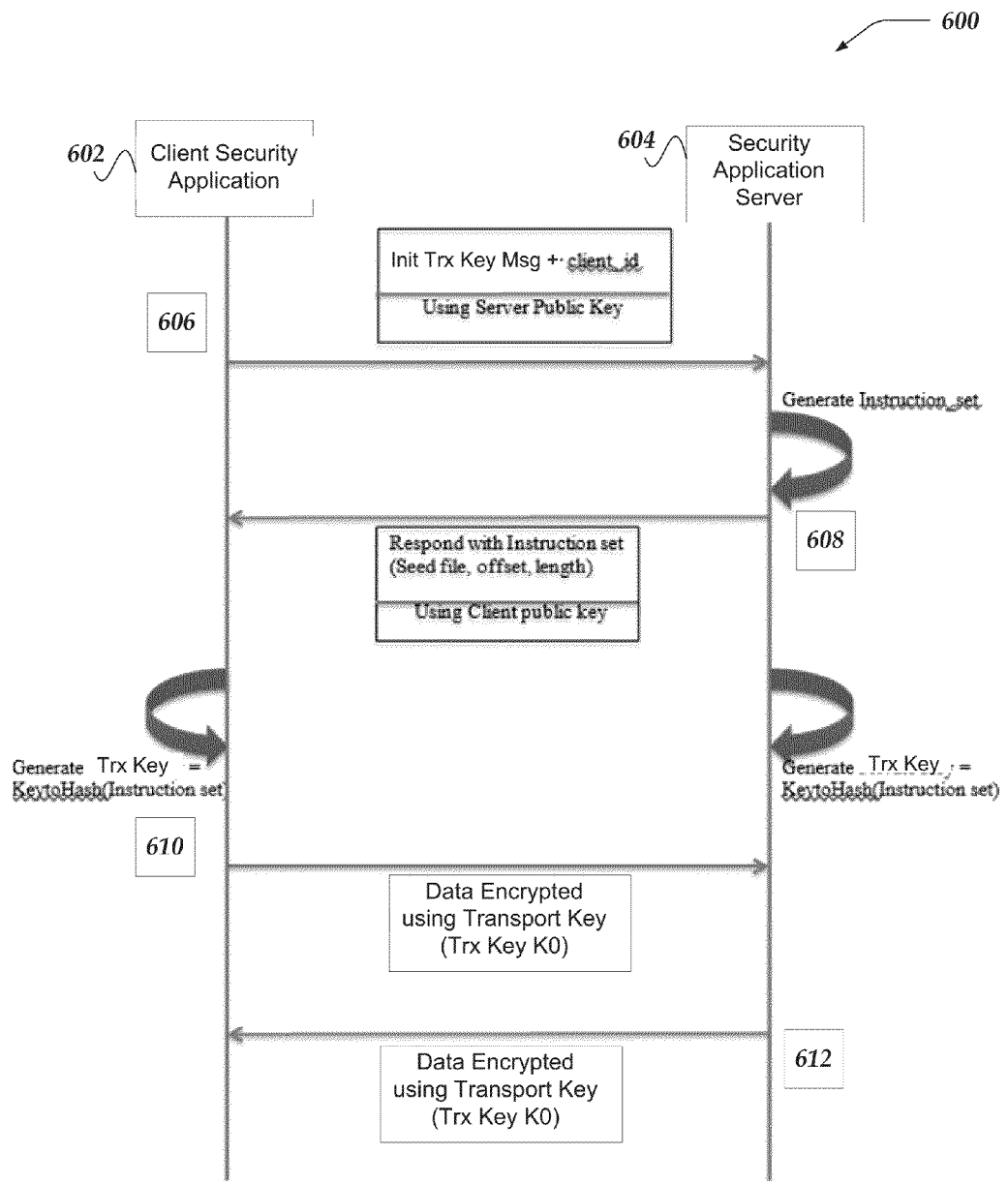
FIGS. 6A-6B show a session key (TRX Key) generation processes performed by a system that is in accordance with at least one of the various embodiments.

At step 538, in at least one of the various embodiments, client security application 522 may decrypt the message bundle using its client private key and value the client ID and store to initial instruction set. At this point, in at least one of the various embodiments, a connection between client security application 522 and security application server 526 may be established. Accordingly, in some embodiments, client security application may indicate that a connection is opened to cloud application client. FIG. 6A shows a transport key generation process performed by system 600 that is in accordance with at least one of the various embodiments. In at least one of the various embodiments, client security applications, and security application servers that are registered with each other (See, FIGS. 5A and 5B) may be arranged to perform various steps to generate an initial transport key to establish a secure communication session between a client security application and a security application server. In this example, system 600 comprises, client security application 602, and security application server 604 that may be in communication over a network.

At step 606, in at least one of the various embodiments, client security application 602 may generate a session request information bundle that includes an initialize transport key request and a client ID. The session request information bundle may be encrypted using the security application server's public key. The encrypted session request information may be provided to security application server 604.

At step 608, in at least one of the various embodiments, security application server 604 may decrypt the session request information bundle using its private key. If the client ID is valid and authentic, security application server 604 may generate an instruction set. In at least one of the various embodiments, the instruction set may include at least three parts, a seed file identifier, position/offset value, and a pass phrase length value. The format of the instruction set may be known in advance to both client security application 602 and security application server 604. In some cases, the instruction set may include information, such as, a version number that indicates the format of the instruction set. In at least one of the various embodiments, the instruction set may be bundled with the client ID of client security application 602. In at least one of the various embodiments, security application server 604 may encrypt the instruction set bundle using client security application 602's public key. In at least one of the various embodiments, the public key may be associated with the client ID of client security application 602 and stored on the security application server as part of the registration of client security application 602 with security application 604 (See, FIG. 5). If the instruction set bundle is successfully encrypted it may be provided to client security application 602.

At step 610, in at least one of the various embodiments, client security application 602 is provided the encrypted instruction set bundle from security application server 604. The instruction set bundle may be decrypted and authenticated by client security application 602. In at least one of the various embodiments, the instruction set bundle may be authenticated by comparing the value of the provided client ID with the client ID of the client security application.

In at least one of the various embodiments, if the instruction set bundle is authenticated and found valid, client security application 602 may generate a transport key for cryptographic operations.

In at least one of the various embodiments, the transport key may be generated using the instruction set information. The instruction set information may be employed to generate a pass phrase from which an initial transport key may be generated.

In at least one of the various embodiments, the seed file identifier may be employed to select a particular seed file that is on or available to the client security application. The offset value may be employed to determine a starting position in the selected seed file. And, the phrase length value may be employed to define the number of words/bytes from the seed file to include in the pass phrase. Once the pass phrase is determined, the pass phrase may be cryptographically hashed to produce a transport key.

Also, since, in at least one of the various embodiments, security application server 604 has the same instruction set and seed files as client security application 602 it may generate the correct transport key using a similar procedure as client security application 602.

Accordingly, in at least one of the various embodiments, an initial transport key may be employed to cryptographically secure communications between client security application 602 and security application server 604. In at least one of the various embodiments, this transport key initialization process enables the initial transport key to be generated without exchanging the transport key over the network. In at least one of the various embodiments, data intended for secure communication may be encrypted using the initial transport key. Similarly, at step 612, if security application server, sends data rather than receives data, it may encrypt the data using the initial transport key. In at least one of the various embodiments, the transport keys for the client security application and the security application server may be independent from each other. Accordingly, in at least one of the various embodiments, one key may be generated for encrypting/decrypting data from the client and another transport key may be generated for encrypting/decrypting data sent from the server. Accordingly, in at least one of the various embodiments, a particular transport key may be employed for one direction of transmission. In at least one of the various embodiments, the transport keys and correspondent workspace memory may be independent for each direction of communication.

Note, in at least one of the various embodiments, the transport keys in step 610 and step 612 may be referred to as initial transport keys at least because the key rotation process inherent in the cryptographic process may generate subsequent transport keys during the ongoing encryption process.

Figure 6B:
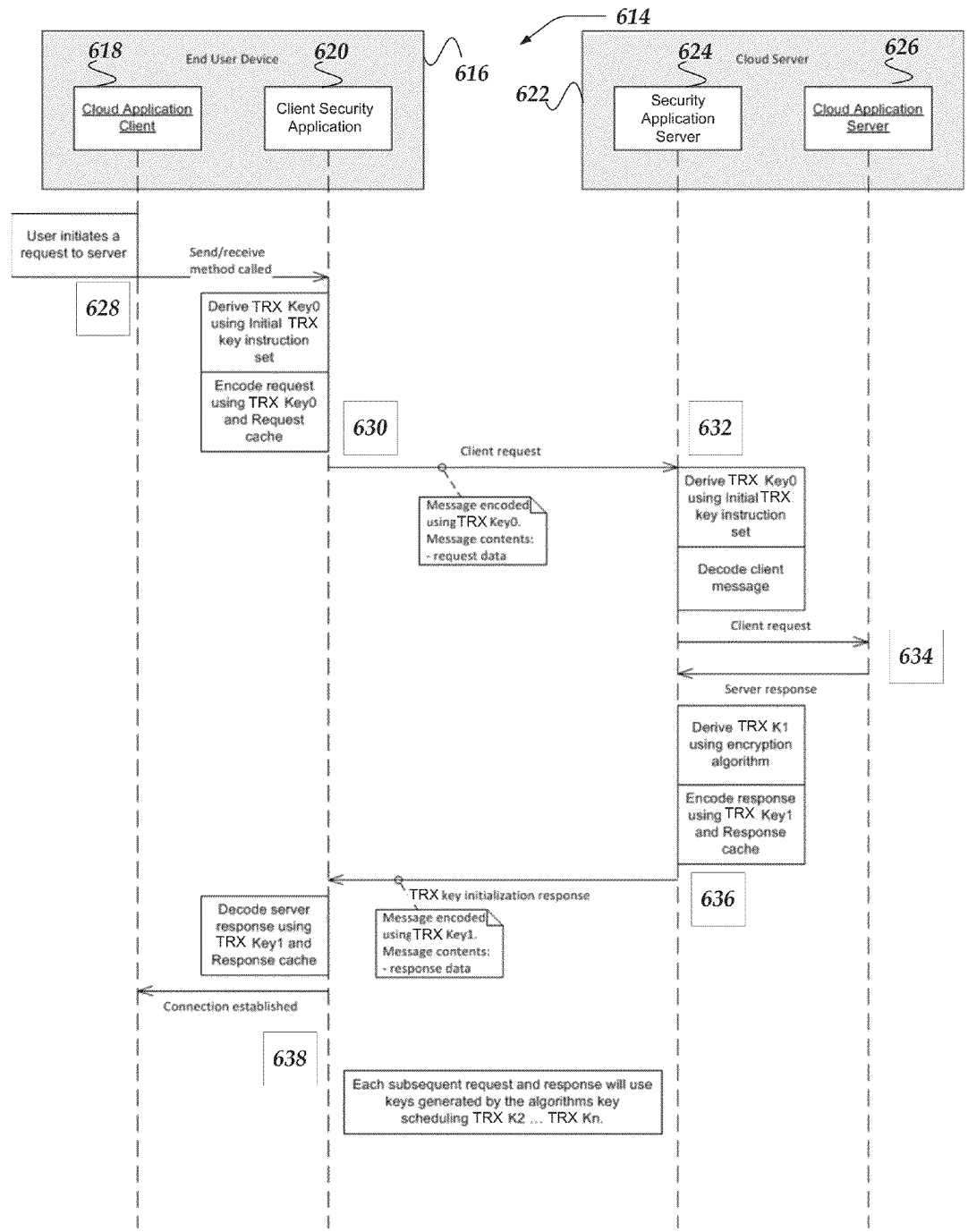

FIG. 6B shows a transport key generation process performed by system 614 that is in accordance with at least one of the various embodiments. In at least one of the various embodiments, client security applications, and security application servers that are registered with each other (See, FIGS. 5A and 5B) may be arranged to perform various steps to generate an initial transport key to establish a secure communication session between a client security application and a security application server. In this example, system 614 comprises, end user device 616 and cloud server 622 that may be in communication over a network. In at least one of the various embodiments, end user device 616 may include cloud application 618 and client security application 620. Also, in at least one of the various embodiments, cloud server 622 may include security application server 624 and cloud application server 626.

At step 628, in at least one of the various embodiments, cloud application client 618 may initiate a service request/message directed to cloud application server 626. In at least one of the various embodiments, the request message may be provided to client security application 620 using a library function call, inter-process communication, or the like, or combination thereof.

At step 630, in at least one of the various embodiments, client security application 620 may generate an initial transport key (TRX key 0) using the initial instruction set that was provided previously by the security application server. Accordingly, the request message may be encrypted using initial transport key (TRX key 0) and provided to cloud server 620 over a network.

At step 632, in at least one of the various embodiments, security application server 624 may generate its copy of TRX Key 0 using its copy of the initial instruction set. Accordingly, it may employ its copy of TRX Key 0 to decrypt the request message provided by client security application 620.

At step 634, in at least one of the various embodiments, security application server 624 may provide the decrypted request message to cloud application server 626. In at least one of the various embodiments, the request message may be provided using one or more inter-process communication methods support by cloud server 622. Further, in at least one of the various embodiments, cloud server application 626 may provide a response message to security application server to provide to cloud application client 618.

At step 636, in at least one of the various embodiments, security application server 624 may generate a subsequent transport key based on one or more encryption algorithms that may be employed. For example, in at least one of the various embodiments, the transport key employed for decrypting the last message sent by the client security application may be cryptographically hashed to generate an initial key for security application server to employ to encrypt information that may be sent to the client security application.

In at least one of the various embodiments, cache (e.g., workspace memory) information that is generated during the decryption of the request message may be employed to derive the next transport key for encrypting the response message. Accordingly, in at least one of the various embodiments, the next transport key may be employed to encrypt to response message. Also, in at least one of the various embodiments, an encryption cache generated during the encryption of the response using the next transport key may be employed to generate an additional key that may be employed to further encrypt the response message. If the response message is encrypted may be provided to client security application 620 over the network, At step 638, in at least one of the various embodiments, client security application 620 may generate a transport key for decrypting the response message that was encrypted using the server's transport key. In at least one of the various embodiments, the client security application may generate its own copy of the server's transport key based on the transport key used by the client to encrypt the request message. For example, in at least one of the various embodiments, the client security application may cryptographically hash its transport key (the as the server did) to generate a transport key to decrypt the encrypted response message that was sent by the security application server. Further, in at least one of the various embodiments, client security application 620 may be arranged to further decrypt the response message based on the values storage in a workspace memory included in an encryption core, such as encryption core 412. Accordingly, the decrypted response message may be provided to cloud application client 618 for processing.

In at least one of the various embodiments, each subsequent request and response may use transport keys generated based on transport key rotation and/or key schedule inherent in the particular encryption algorithm. In at least one of the various embodiments, such transport keys may be generated based on cryptographic information that may be generated during the previous messages encryption and/or decryption. In at least one of the various embodiments, such cryptographic information may be a consequence of a particular cryptographic process and/or it may be explicitly generated using one or more key rotation/generation protocols.

Generalized Operation

The operation of certain aspects of the invention will now be described with respect to FIGS. 7-14. In at least one of various embodiments, processes 700, 800, 900, 1000, 1100, 1200, 1300 and 1400 described in conjunction with FIGS. 7-14, respectively, may be implemented by and/or executed on a network computer, such as network computer 300 of FIG. 3. In other embodiments, these processes or portions of these processes may be implemented by and/or executed on a plurality of network computers, such as network computer 300 of FIG. 3. Further, in other embodiments, these processes or portions of these processes may be implemented by and/or executed on one or more client computers, such as client computer 200 as shown in FIG. 2. Also, in at least one of the various embodiments, these processes or portions of these processes may be implemented by and/or executed on one or more cloud instances operating in one or more cloud networks. However, embodiments are not so limited and various combinations of network computers, client computer, cloud computer, or the like, may be utilized.

Figure 7:
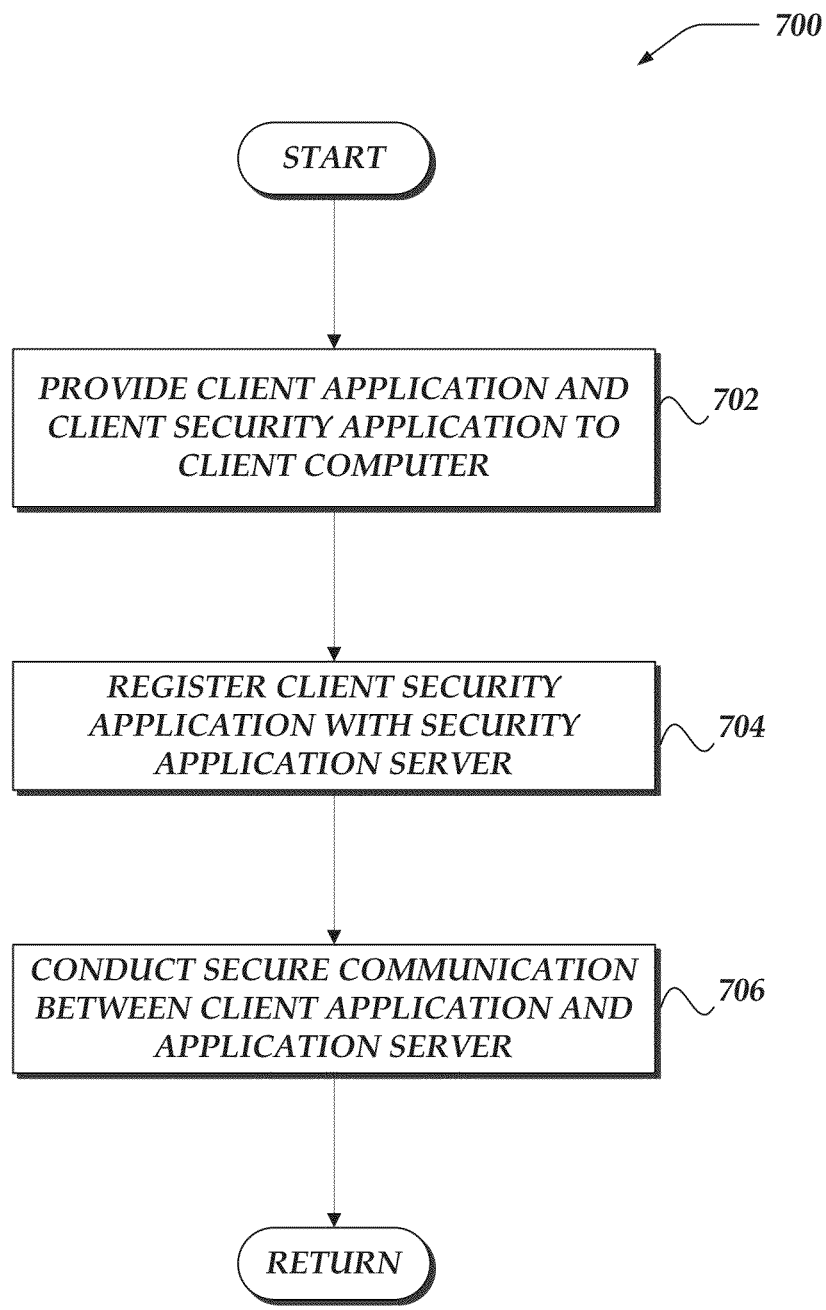
FIG. 7 shows an overview flowchart of a process that secures communications in accordance with at least one of the various embodiments.

FIG. 7 shows an overview flowchart for process 700 to secure communications in accordance with at least one of the various embodiments. After a start block, at block 702, in at least one of the various embodiments, provide a client application and a client security application to a client computer. At block 704, in at least one of the various embodiments, the client computer may be registered for secure communication by registering the client security application with the appropriate security application server. At block 706, in at least one of the various embodiments, since the client security application is registered with the security application server, cryptographic secure communication between them may be conducted. Next, control may be return to a calling process.

Figure 8:
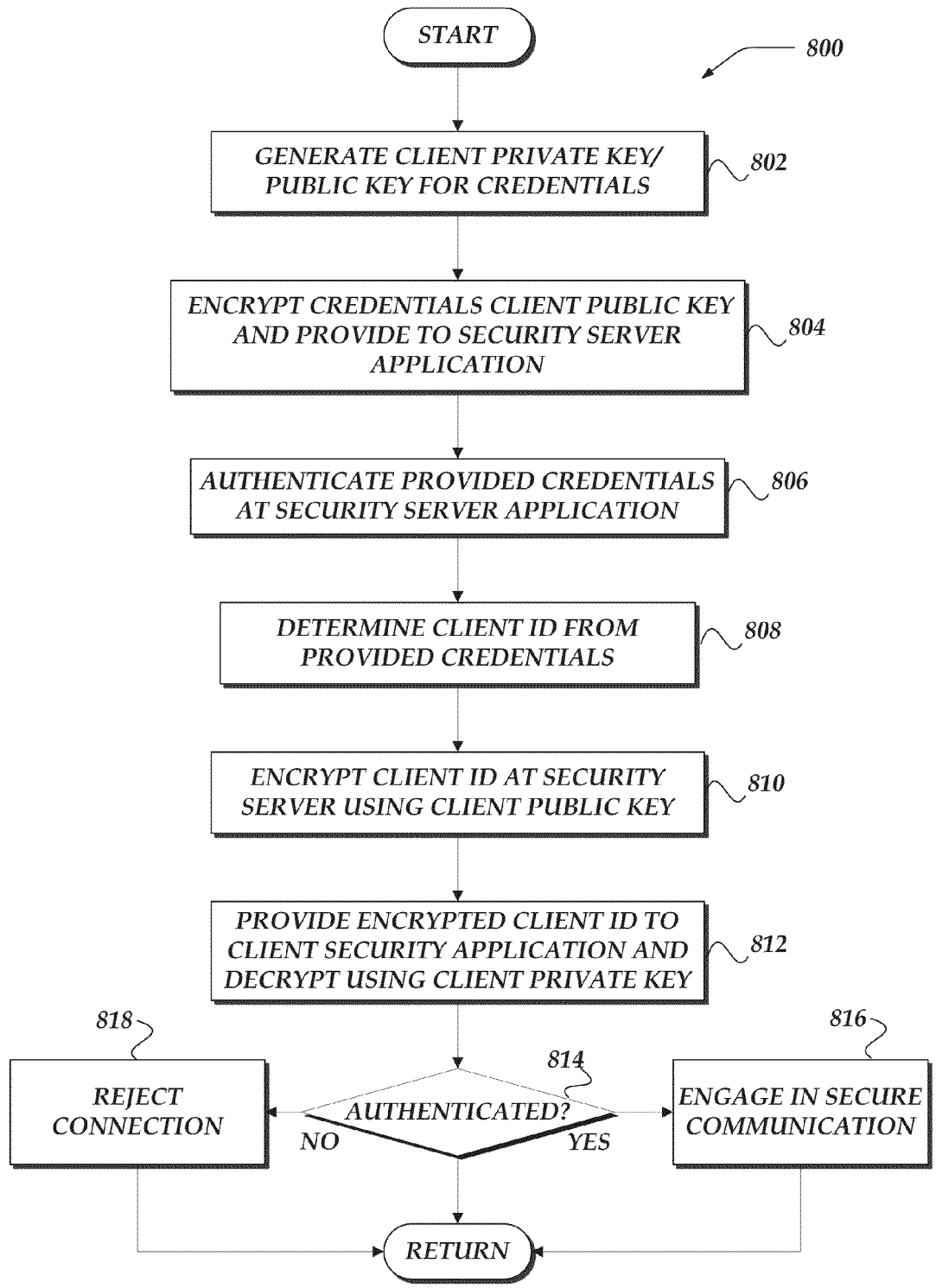
FIG. 8 shows a flowchart of a process that registers a client security application with a security server application in accordance with at least one of the various embodiments.

FIG. 8 shows a flowchart of process 800 to register a client security application with a security application server in accordance with at least one of the various embodiments. After a start block, at block 802, in at least one of the various embodiments, a client security application, such as, client security application 217 in FIG. 2, may generate a cryptographic private key/public key pair for public-key encryption.

At block 804, in at least one of the various embodiments, credential information associated with the client security application, including at least its public key may be combined into a registration information bundle and encrypted using a public key that corresponds to the security application server that the client security application is registering with. If encrypted successfully, the encrypted registration information bundle may be provided to the target security application server.

In at least one of the various embodiments, the client security application may be preinstalled with the public key for one or more of its associated security application servers. Also, in at least one of the various embodiments, the public key corresponding to a targeted security application server may be provided by some other means, such as, downloaded from a secure portal, or the like.

In at least one of the various embodiments, the registration information may include a client ID that uniquely identifies the source of the registration request. In at least one of the various embodiments, the client ID may be comprised of an entity ID and a platform ID that are associated with the client security application that is attempting to register with the security application server.

At block 806, in at least one of the various embodiments, the security application server may decrypt and authenticate the provided registration information bundle. In at least one of the various embodiments, the security application server may employ its private key that corresponds to the public key employed by the client security application to encrypt the registration information bundle. In at least one of the various embodiments, the decrypted credential information may be employed to authenticate the client security application. For example, the security application server may authenticate the registration attempt by comparing the entity ID included in the provided client ID to the entity ID associated with itself, the particular security application server.

At block 808, in at least one of the various embodiments, the security application server may generate a response information bundle that includes a copy of the client ID. At block 810, in at least one of the various embodiments, the security application server may encrypt the response information bundle. In some embodiments it may be encrypted using the public key of the client security application.

At block 812, in at least one of the various embodiments, the encrypted response bundle may be provided to the client security application. In at least one of the various embodiments, upon obtaining the encrypted the response bundle, the client security application may decrypt the response bundle using its private key. If the response bundle is decrypted the client security application may authenticate the response by comparing the client ID that is included in the response bundle with its own client ID. If the client ID included in the response bundle matches the client security application's own client ID the response may be determined to be valid and authentic.

At decision block 814, in at least one of the various embodiments, if the response bundle is authenticated by the client security application, control may flow to block 816; otherwise, control may flow to block 818.

At block 816, in at least one of the various embodiments, since the client security application successfully registered with the security application server they may engage in secure communication. Next, control may be returned to a calling process. At block 818, in at least one of the various embodiments, since the response bundle was not successfully authenticated, the client security application may reject/cancel the registration attempt. Next, control may be returned to a calling process.

Figure 9A:
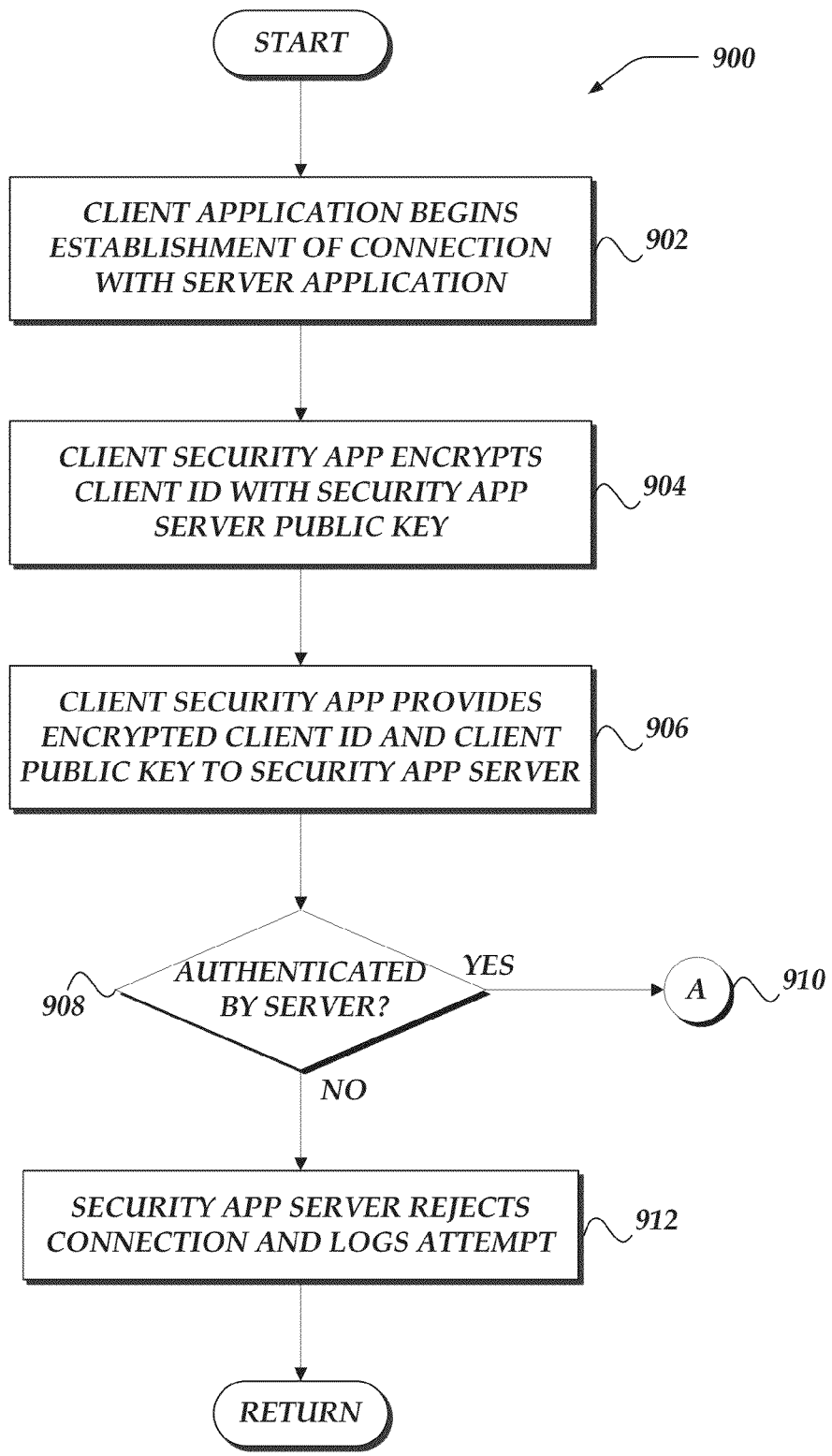
FIG. 9A shows a flowchart of a process that conducts a communication session between a client security application and a security application server in accordance with at least one of the various embodiments.

FIG. 9A shows a flowchart of process 900 to perform actions to conduct a communication session between a client security application and a security application server in accordance with at least one of the various embodiments. After a start block, at block 902, in at least one of the various embodiments, a client application may attempt to communicate with a server application. As described above, the client application may be installed on a client computer that includes a client security application, such as, client security application 217. Likewise, the server application may be hosted on server computer that includes security application server.

At block 904, in at least one of the various embodiments, the client security application may encrypt its client ID using the public key of the security application server that it is registered. In at least one of the various embodiments, the client ID may be comprised of a platform ID and an entity ID that is associated with the client security application on the client computer. In at least one of the various embodiments, the client security application may generate a session request information bundle that includes the client ID and request as described in FIG. 6. The session request bundle may be encrypted using the public key of the security application server.

At block 906, in at least one of the various embodiments, the client security application may be provide the encrypted session request bundle to the security application server. At decision block 908, in at least one of the various embodiments, if the session request bundle is authenticated successfully by the security application server, control may flow to connector 910 for further processing; otherwise, control may flow to block 912.

At block 912, in at least one of the various embodiments, since the session request bundle is not authenticated the security application server may reject the communication session request. Also, in at least one of the various embodiments, the security application server may log the failed attempt or otherwise notify an administrator of the failed connection attempt. Next control may flow to a calling process.

Figure 9B:
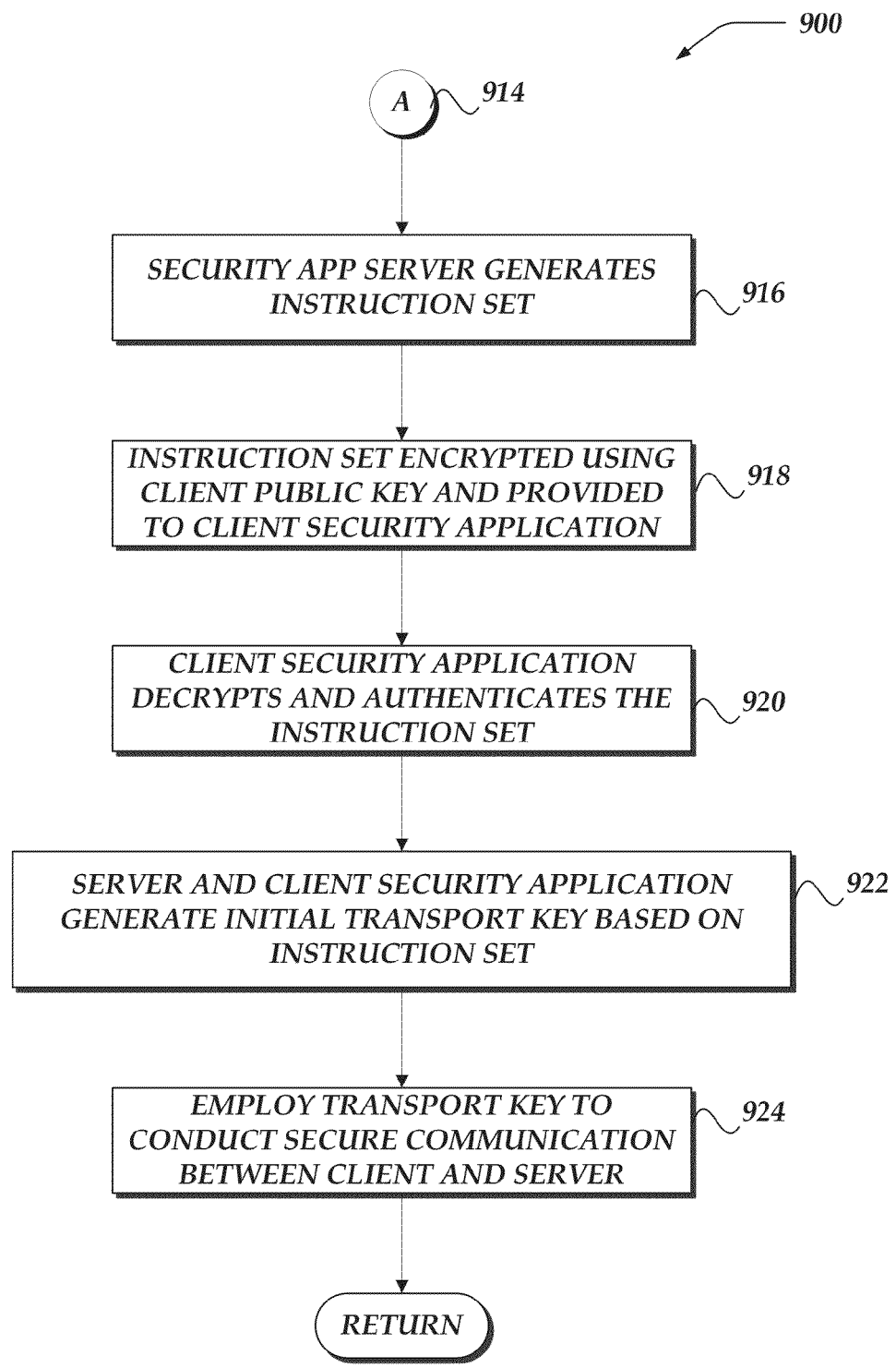
FIG. 9B shows a flowchart of a process that conducts a communication session between a client security application and a security server application in accordance with at least one of the various embodiments.

FIG. 9B shows a continuation flowchart of process 900 that establishing a communication session between a client security application and a security server application in accordance with at least one of the various embodiments. After connector 914 (label as connector 910 in FIG. 9A), at block 916, in at least one of the various embodiments, the security application server may generate an instruction set for the session. As described above, the instruction set may comprise a seed file identifier, offset value, and pass phrase length. In at least one of the various embodiments, the values of each component of the instruction set may be generated using a random number generator. In some embodiments, additional policy based rules and/or configuration may be employed to influence/restrict the selection of instruction set value. For example, a rule may be employed to ensure that the instruction set information is not duplicated. Or, to ensure that the resultant pass phrases do not overlap, or that have sufficient length and/or entropy as defined by one or more predefined threshold values.

At block 918, in at least one of the various embodiments, the security application server may generate an instruction set bundle that includes the client ID of the client security application, and the instruction set. In at least one of the various embodiments, the security application server may encrypt the instruction set bundle using the public key of the client security application. If encrypted successfully, the encrypted instruction set bundle may be provided to the client security application.

At block 920, in at least one of the various embodiments, the client security application may decrypt and authenticate the instruction set bundle that is provided by the security application server. In at least one of the various embodiments, the client security application may decrypt the instruction set bundle using the client security application's private key.

In at least one of the various embodiments, the client security application may authenticate the instruction set bundle by comparing the client ID included in the bundle with the client security application's own client ID. If the value matches the instruction set bundle may be authenticated.

At block 922, in at least one of the various embodiments, both the client security application and the security application server may generate local copies of a symmetric transport key based on the instruction set information. In at least one of the various embodiments, the client security application may employ the instruction set sent by the security application server to generate its local copy of the transport key. And, in some embodiments, the security application server may employ the instruction set information to generate its local copy of the transport key.

In at least one of the various embodiments, the security applications may determine a seed file identifier from the instruction set. In at least one of the various embodiments, the identifier may be an index into the set of available seed files. In other embodiments, other values such as file names may be employed.

In at least one of the various embodiments, a seed file corresponding to the seed file identifier may be determined. Accordingly, the security applications may employ the offset value to determine position in the in seed file. For example, if the offset value 120, the security application may count 120 bytes and/or words from the beginning of the seed file to determine a starting point for generating a pass phrase. Next, in at least one of the various embodiments, the pass phrase length value may define how many bytes/words from the seed file starting at the offset point to include in a pass phrase. In at least one of the various embodiments, if the pass phrase is selected, the transport key may be generated by cryptographically hashing the pass phrase to produce the key.

At block 924, in at least one of the various embodiments, the client security application and the security application server may employ their respective transport keys to conduct cryptographically secure communication. Next, control may be returned to a calling process.

Figure 10:
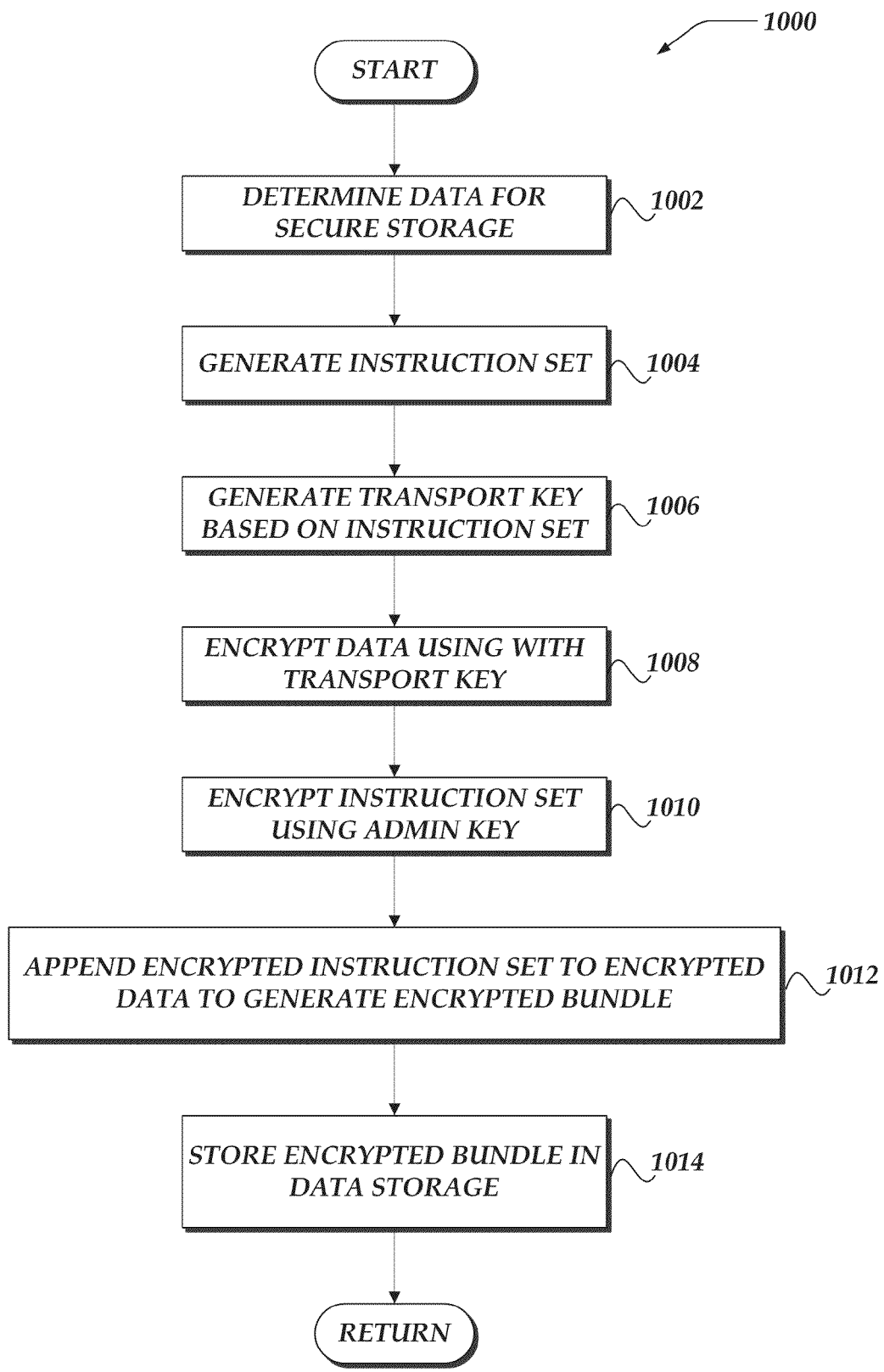
FIG. 10 shows a flowchart of a process that secures data storage using a security application server in accordance with at least one of the various embodiments.

FIG. 10 shows a flowchart of process 1000 to secure data storage using a security application server in accordance with at least one of the various embodiments. After a start block, at block 1002, in at least one of the various embodiments, the data being securely stored may be determined. For example, in at least one of the various embodiments, a server application coupled with a security application server may provide the data to be securely stored to the security server application. In at least one of the various embodiments, the server application may employ an API provided by the security application server to securely store the data.

At block 1004, in at least one of the various embodiments, the security application server may generate an instruction set to employ for generating the initial; transport key for encrypting the data. In at least one of the various embodiments, the security application server may employ the same procedures as described in for process 900 to generate an instruction set.

At block 1006, in at least one of the various embodiments, the security application server may generate the initial transport key based on the generated instruction set. In at least one of the various embodiments, rather than generating an encrypted instruction set bundle and providing it to a client security application, the security application server may directly employ the instruction set information to generate a transport key. At block 1008, in at least one of the various embodiments, the security application server may employ the transport key to encrypt the data.

At block 1010, in at least one of the various embodiments, the security application server may encrypt the instruction set using an admin key that is known only the security application server.

At block 1012, in at least one of the various embodiments, the encrypted instruction set may be appended (or prepended) to the encrypted data to generate an encrypted data bundle. At block 1014, in at least one of the various embodiments, the encrypted data bundle may be stored in the data store. Next, control may be returned to a calling process.

In at least one of the various embodiments, secure data storage may be provided for files in file system, and/or data that is stored a database. In at least one of the various embodiments, in the case of databases, the scope of the data bundle is an individual column value for a row in a table. Accordingly, the server application may request that one or more columns in a database table are encrypted. Thus, in at least one of the various embodiments, each encrypted value in the database is bundled with its own instruction set.

In at least one of the various embodiments, the security application may receive unencrypted data from the server application and encrypt as described above. In at least one of the various embodiments, the security application may encrypt the data and provide it back to the server application enabling the server application to store the data in a file, database, or the like.

Figure 11:
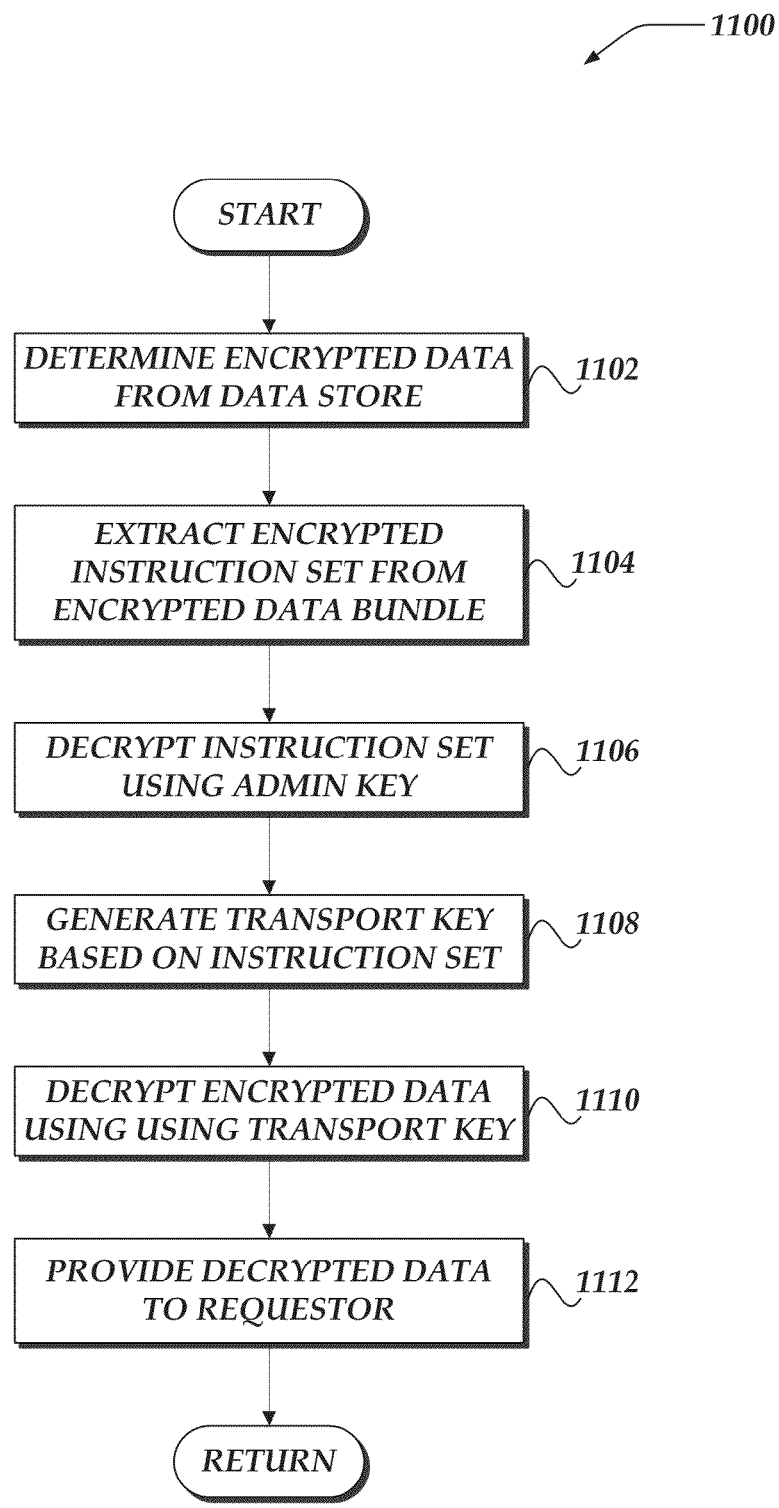
FIG. 11 shows a flowchart of a process that loads encrypted data from data storage using a security application server in accordance with at least one of the various embodiments.

FIG. 11 shows a flowchart of process 1100 that loads encrypted data from data storage using a security application server in accordance with at least one of the various embodiments. After a start block, at block 1102, in at least one of the various embodiments, the encrypted data nay determined. For example, in at least one of the various embodiments, a server application coupled with a security application server may provide a query/request to the security application sever to retrieve encrypted data that is stored in the data store. At block 1104, in at least one of the various embodiments, the security application server may retrieve the encrypted data bundle from storage and extract the encrypted instruction set from the encrypted bundle. At block 1106, in at least one of the various embodiments, the security application server may decrypt the instruction set using the same admin key that was employed to encrypt it. At block 1108, in at least one of the various embodiments, the security application server may generate the initial transport key based on the instruction set information. At block 1110, in at least one of the various embodiments, the security application service may decrypt the requested data by employing the transport key. At block 1112, in at least one of the various embodiments, the decrypted data may be provided to the requestor. Next, control may be returned to a calling process.

Figure 12:
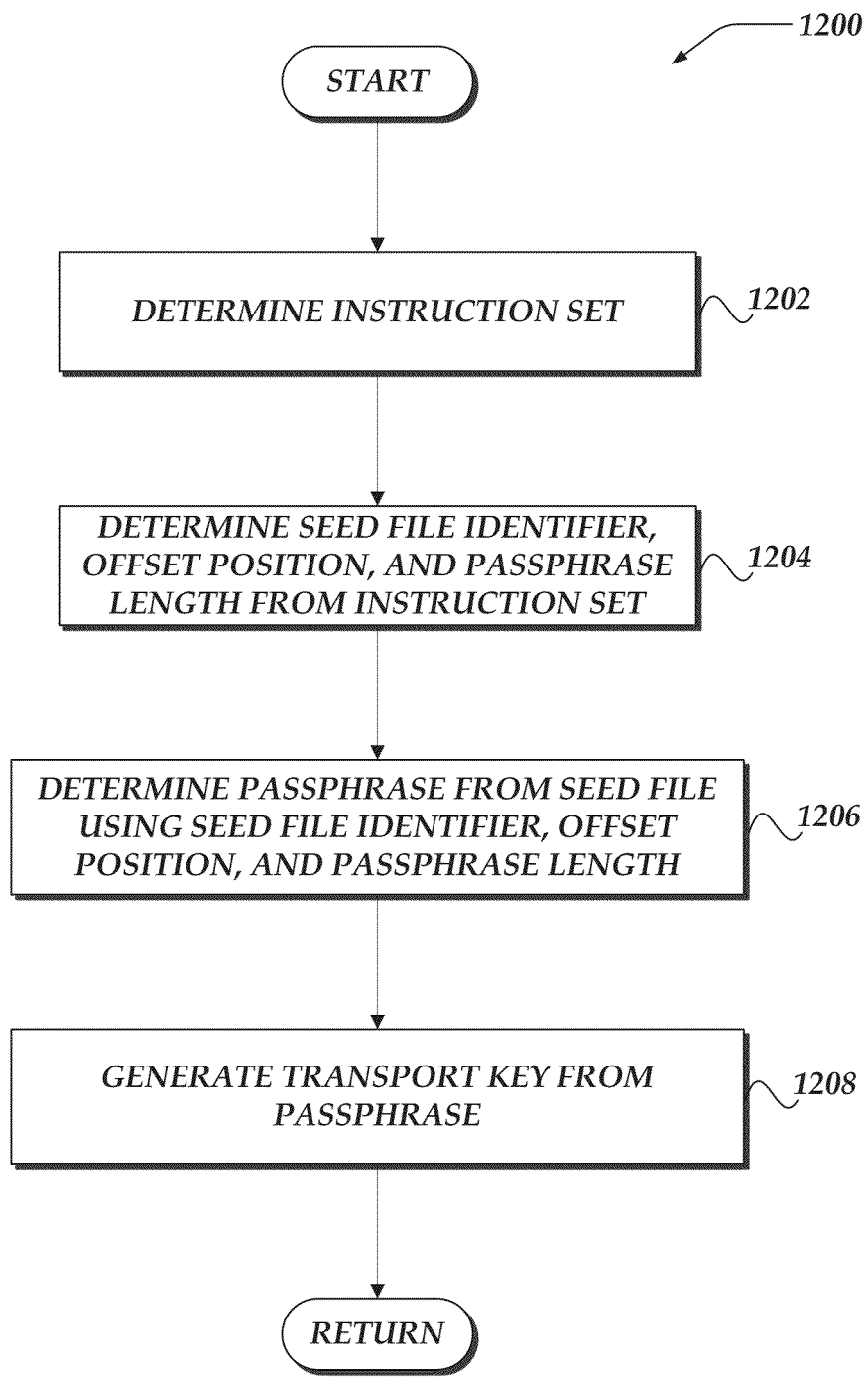
FIG. 12 shows a flowchart of a process that generates a transport key from an instruction set in accordance with at least one of the various embodiments.

FIG. 12 shows a flowchart of process 1200 for generating a transport key from an instruction set in accordance with at least one of the various embodiments. After a start block, at block 1202, in at least one of the various embodiments, the relevant instruction set may be determined. In at least one of the various embodiments, if process 1200 is running on client computer, a client security application may determine the instruction set from an instruction set bundle provided by a security application server. In at least one of the various embodiments, if process 1200 is running on a server computer, the instruction set may have been randomly generated during the establishment of a communication session with a client security application. And, in at least one of the various embodiments, if process 1200 is participating in a secure storage operation, the instruction set may be generated by the security application server and/or extracted from a storage bundle retrieved from a data store.

At block 1204, in at least one of the various embodiments, process 1200 may determine the necessary values from the instruction set, such as, the seed file ID, offset position, and pass-phrase length. At block 1206, in at least one of the various embodiments, process 1200 may determine the pass-phrase from a seed file based on the instruction set values.

At block 1208, in at least one of the various embodiments, process 1200 may generate the transport key from the pass-phrase. In at least one of the various embodiments, various deterministic techniques may be employed to generate the transport key from the pass-phrase. For example, in at least one of the various embodiments, a one-way cryptographically secure hash algorithm may be employed to generate the transport key from the pass-phrase. Next, control may be returned to a calling process.

Figure 13:
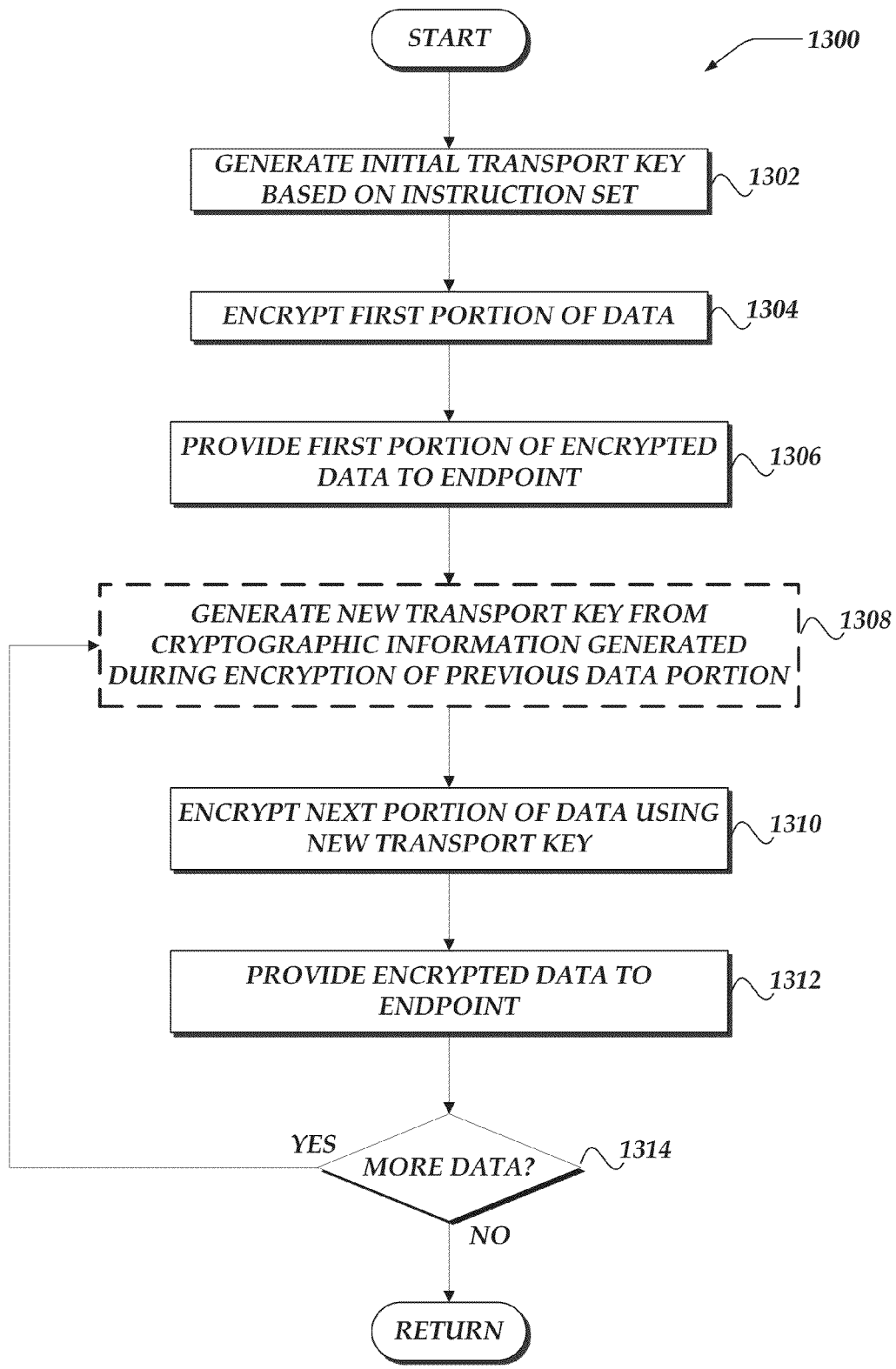
FIG. 13 shows a flowchart of a process that performs key generation during encryption of data in accordance with at least one of the various embodiments.

FIG. 13 shows a flowchart of process 1300 for key generation during encryption of data in accordance with at least one of the various embodiments. After a start block, at block 1302, in at least one of the various embodiments, an initial transport key may be generated based on an instruction set as described above.

At block 1304, in at least one of the various embodiments, the first portion of the data may be encrypted using the initial transport key. In at least one of the various embodiments, the data may be compressed and then encrypted depending on the configuration of the security application.

In at least one of the various embodiments, one or more various symmetric or asymmetric compression algorithms may be employed. Likewise, one or more encryption protocols may be employed. In at least one of the various embodiments, the encryption/decrypt may be arranged to use the initial transport key to perform symmetric cryptographic operation on the data.

In at least one of the various embodiments, during the cryptographic operation (compression, encryption) performed on the first portion of data, the security application may determinately produce resultant information that is stored in a workspace memory. In at least one of the various embodiments, this information may be produced as a side-effect of the particular cryptographic operations being performed. Or, in some embodiments, it may be deliberately generated from the first data portion and/or the first cypher data portion.

At block 1306, in at least one of the various embodiments, the encrypted first portion of data may be provided to an appropriate endpoint (e.g., a client security application or a security application server). In at least one of the various embodiments, if the data is encrypted for storage the encrypted data may be accumulated locally until it stored as part of an encrypted storage bundle.

At block 1308, in at least one of the various embodiments, optionally, a new transport key may be generated based in part on cryptographic information that was generated when the first portion of data was encrypted (in block 1304) and stored in the workspace memory. In at least one of the various embodiments, a portion or the entirety of the data in the workspace memory may be cryptographically hashed with the previous transport key to produce the new transport key.

In at least one of the various embodiments, the transport key may be preserved across calls as part of the cipher state associated with a communication session (rather than a new key being generated during the encryption process). In at least one of the various embodiments, the transport key may be stored as needed and reloaded if there may be more data to encrypt for the session.

At block 1310, in at least one of the various embodiments, a next portion of data may be encrypted using the transport key. Similar, as described in block 1304, the workspace memory will be filled with new information corresponding the next portion of the data.

At block 1312, in at least one of the various embodiments, the encrypted next portion of data may be provided to the appropriate endpoint. In at least one of the various embodiments, if the data is encrypted for storage the encrypted data may be accumulated locally until it stored as part of an encrypted storage bundle. At decision block 1314, in at least one of the various embodiments, if more data is available for encryption, control may loop back to block 1308; otherwise, control may be returned to a calling process.

Figure 14:
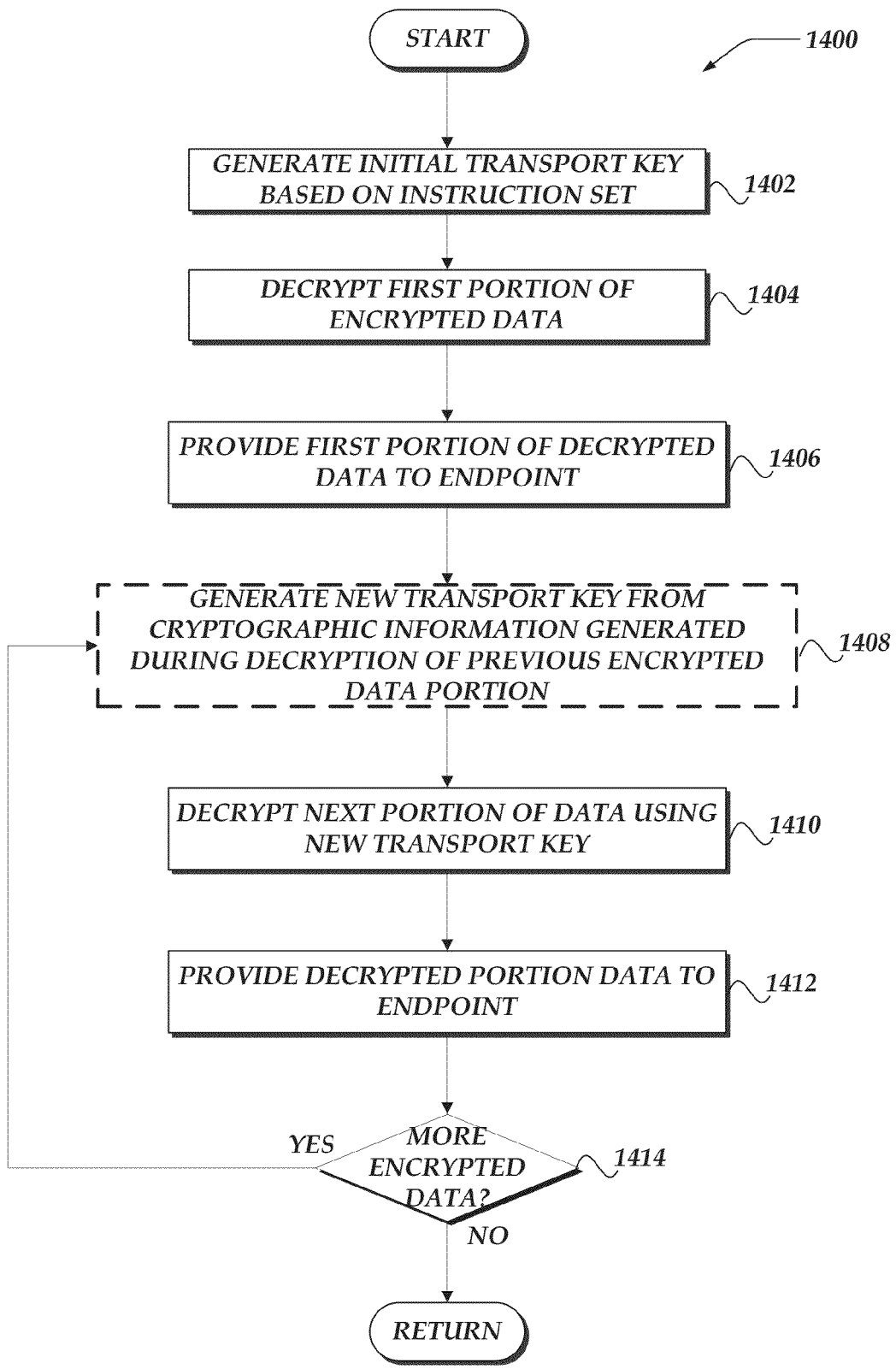
FIG. 14 shows a flowchart of a process for key generation during decryption of data in accordance with at least one of the various embodiments.

FIG. 14 shows a flowchart of process 1400 for key generation during decryption of data in accordance with at least one of the various embodiments. In at least one of the various embodiments, decryption may be considered the inversion of encryption (process 1300).

After a start block, at block 1402, in at least one of the various embodiments, an initial transport key may be generated based on an instruction set as described above. In at least one of the various embodiments, since both sides of the communication know the instruction set the initial transport key will be the same. In at least one of the various embodiments, the current operation is part of a secure storage load operation, the instruction set may be retrieved from the encrypted data bundle. At block 1404, in at least one of the various embodiments, the first portion of the encrypted data may be decrypted using the initial transport key. In at least one of the various embodiments, the decryption step may be arranged to fill a workspace memory based on the results of the cryptographic operations similarly as described for block 1304. At block 1406, in at least one of the various embodiments, the decrypted first portion of encrypted data may be provided to the appropriate endpoint.

At block 1408, in at least one of the various embodiments, optionally, a new transport key may be generated based in part on cryptographic information that was generated when the first portion of encrypted data was decrypted (in block 1404) and stored in the workspace memory. In at least one of the various embodiments, a portion or the entirety of the data in the workspace memory may be cryptographically hashed with the previous transport key to produce the new transport key.

Alternatively, in at least one of the various embodiments, the transport key may be preserved across calls as part of the cipher state associated with a communication session (rather than a new key being generated during the decryption process). In at least one of the various embodiments, the transport key may be stored as needed and reloaded if there may be more data to decrypt for the session.

At block 1410, in at least one of the various embodiments, a next portion of encrypted data may be decrypted using the transport key. Similarly as described in block 1404, the workspace memory will be filled with new information corresponding the next portion of the data.

At block 1412, in at least one of the various embodiments, the decrypted next portion of the encrypted data may be provided to the appropriate endpoint. At decision block 1414, in at least one of the various embodiments, if more encrypted data is available for decryption, control may loop back to block 1408; otherwise, control may be returned to a calling process.

Illustrative Logical System for Transparent Denial of Service Protection

Figure 15:
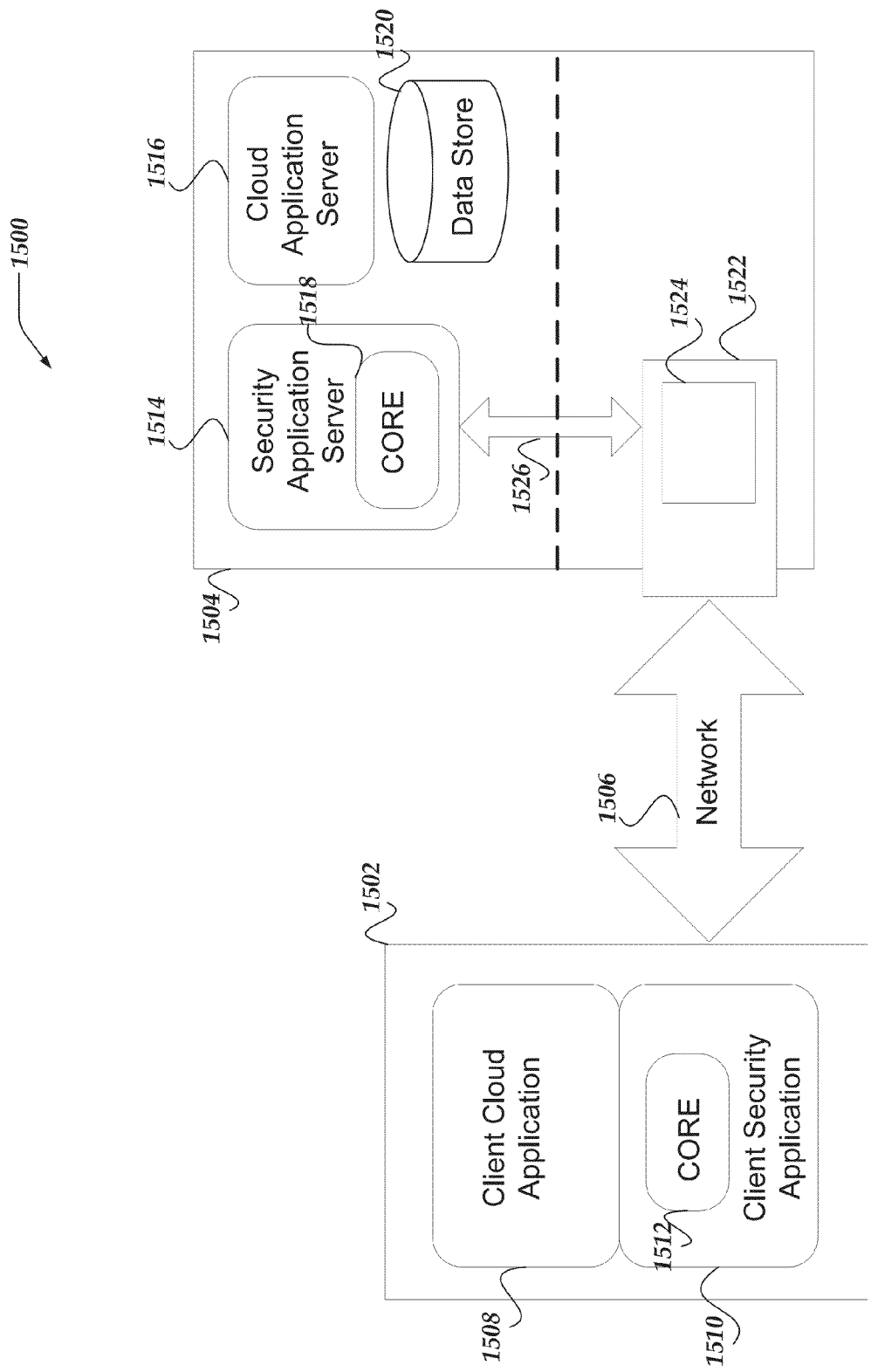
FIG. 15 shows an overview of architecture for of secure networking system in accordance with at least one of the various embodiments.

FIG. 15 shows an overview of architecture for of secure networking system 1500 in accordance with at least one of the various embodiments. System 1500 includes client computer 1502 that may be in communication with application server computer 1504 over network 1506. In at least one of the various embodiments, except differences described below, system 1500 may be similar to system 400 shown in FIG. 4.

Accordingly, in at least one of the various embodiments, client computer 1502 may be a client computer, such as, client computer 200. Likewise, in at least one of the various embodiments, application server computer 1504 may be a network computer, such as, network computer 300. Further, in at least one of the various embodiments, network 1506, may be a network such as, wireless network 108, network 110, cloud network 112, or the like, or combination thereof.

In at least one of the various embodiments, client computer 1502 may include client cloud application 1508 that may be logically coupled with client security application 1510. Further, client security application may include one or more components, such as, core 1512.

Similarly, in at least one of the various embodiments, application server computer 1504 may include security application server 1514, and cloud application server 1516. Similar to client security application, security application server 1514 may include one or more components, such as, core 1518. In some embodiments, server computer 1504 may include one or more data storage systems, such as, data store 1520.

In at least one of the various embodiments, client cloud application 1508 may transparently employ client security application 1510 to securely (cryptographically secure) communicate with a cloud application server, such as, cloud application server 1516. Likewise, in at least one of the various embodiments, cloud application server 1516 may be arranged to employ security application server 1518 to cryptographically secure communications between itself and client cloud applications, such as, client cloud application 1508.

In at least one of the various embodiments, client security application 1510 may be embedded with credential information that is associated with the entity that owns the server cloud application. Also, in at least one of the various embodiments, the cloud security application and/or the server security application may be arranged include other predefined identifiers for associating one or more client security applications with one or more particular security application servers. In at least one of the various embodiments, seed files, client identifiers, entity identifiers, platform identifiers, or the like, may be preinstalled (e.g., built-in) client security applications, such as, client security application 1510.

In at least one of the various embodiments, application server computer 1504 may be arranged to include a hardware network interface, such as, network interface 1522. In at least one of the various embodiments, network interface 1522 may be similar to network interfaces 330 in network computer 300.

In at least one of the various embodiments, network interface 1522 include a packet inspection engine, such as, packet inspection engine 1524. In at least one of the various embodiments, a packet inspection engine may be arranged to include one or more filters, rules, conditions, or the like, that may be applied to determine if network packets are accepted by the hardware network interface.

In at least one of the various embodiments, one or more of the rules may be comprised of byte patterns that are stored in one or more hardware registers of the network interface. In at least one of the various embodiments, a rule may be arranged to block and/or discard network packets if a particular pattern stored in one or more register sets of the network interface is not present in the network packet. Accordingly, in at least one of the various embodiments, network packets that do not include the pattern required by the rules may be discarded before leaving the hardware network interface rather than being provided to higher level systems, such as, the operating network stack over a communication path, such as, communication path 1526.

In at least one of the various embodiments, security application server 1514 may be configured to provide an information that includes an instruction set that may be used by a client, such as, client security application 1510 to generate a network packet key. Accordingly, in at least one of the various embodiments, client security application 1510 may generate a security header that includes the network packet key. In at least one of the various embodiments, the security header may be added one or more network packets that are sent by client security application 1510.

Also, in at least one of the various embodiments, security application server 1514 may employ the same instruction set to generate a network packet key that may be provided to a packet inspection engine, such as, packet inspection engine 1524 in a network interface 1522. Accordingly, the network interface may be configured to discard network packets that do not include a byte pattern corresponding to the network packet key.

In at least one of the various embodiments, the network packet key may be generated from an instruction set similar to how a transport key is generated from an instruction set. In at least one of the various embodiments, the instruction set may include different information that the instruction set used for transport keys, but the process of generating the network packet key may be the same as generating a transport key. Further, the instruction set for generating the network packet key may be provided to the client security application, at various times, such as, when the client security application is provisioned/registered with the security application server; during establishment of a communication session (e.g., at the same time an instruction for a transport key is provided); upon the expiration of a timeout; as requested by a user or administrator; or the like.

In at least one of the various embodiments, the network packet key may be encrypted by the client using a public key that may be provided by the server. In at least one of the various embodiments, the encrypted network packet key may be communicated to the server along with the encrypted data. The public key from the server may be provided when the client registers with the server for the first time. Or, in some embodiments, the server public key may be provided at the begging of a session along with the instruction set information. Accordingly, the server may decrypt the encrypted network packet key using its corresponding private key to confirm the authenticity/source of the client's transmission.

In at least one of the various embodiments, the network transport key may be generated on the server computer and securely communicated to the client computer. In at least one of the various embodiments, the security application server may encrypt the network transport key using its private key enabling to the client computer to decrypt the network transport key using the corresponding private key.

Further, in at least one of the various embodiments, application server computer 1504 is arranged to include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like.

For example, in at least one embodiment, geolocation information (such as latitude and longitude coordinates, or the like) is collected by a hardware GPS sensor and subsequently employed to introduce entropy for generating a network packet key from a passphrase. Similarly, in at least one embodiment, weather information (such as temperature, atmospheric pressure, wind speed, humidity, or the like) is collected by a hardware weather sensor and subsequently employed to introduce entropy. Additionally, in at least one embodiment, electrical power information (such as voltage, current, frequency, or the like) is collected by a hardware electrical power sensor and subsequently employed to introduce entropy for generating a network packet key from a passphrase.

Figure 16:
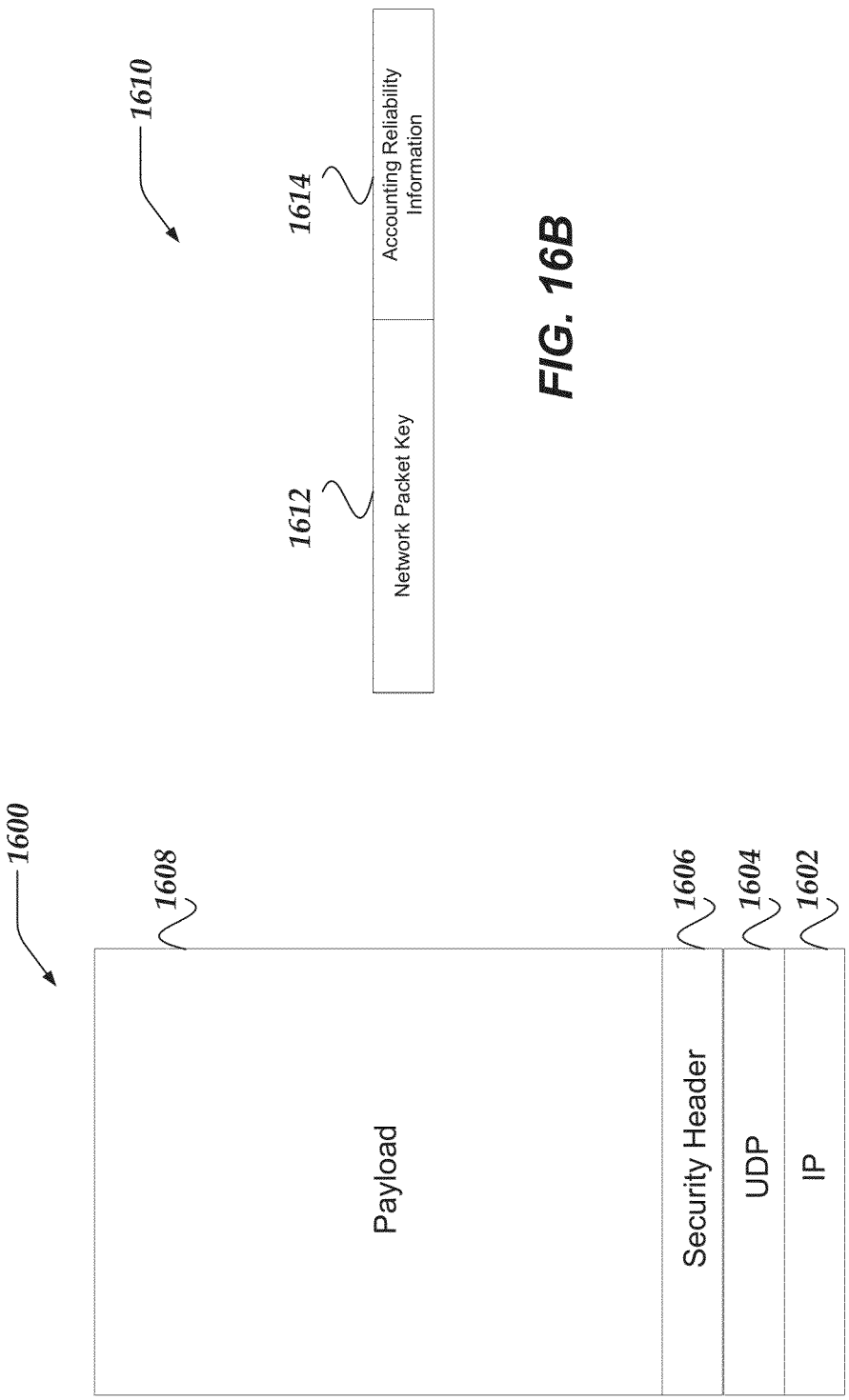
FIGS. 16A and 16B illustrate logical schematics of network packets and/or portions of network packets in accordance with at least one of the various embodiments.

FIGS. 16A and 16B illustrate logical schematics of network packets and/or portions of network packets in accordance with at least one of the various embodiments.

FIG. 16A illustrates a logical schematic of network packet 1600 used for communicating with a security application server in accordance with at least one of the various embodiments. In at least one of the various embodiments, as described above, a network interface in an application server computer may be arranged filter incoming network packets based on a network packet key.

Accordingly, in at least one of the various embodiments, network packet may be arranged to include information that includes the appropriate network packet key. In at least one of the various embodiments, network packet 1600 may be arranged to be compatible with the network protocol that is being used to communicate over a network between the client security application and the server security application. For example, packet 1600 may include IP header 1604, UDP header 1604 and a payload section that includes the application data that may be provided by the client application that is using the client security application for communication.

In at least one of the various embodiments, as described, above, the client security application may generate security information and include in a security header, such as, security header 1606. In at least one of the various embodiments, security header 1606 may include at least the network packet key generated from instruction set provided by the security server application.

In at least one of the various embodiments, payload 1608 may be unencrypted, encrypted, uncompressed, compressed, or encrypted and compressed. In at least one of the various embodiments, the payload may include a network packet as provided by a client application that is wrapped by the client security application in preparation for sending to the server security application. In some embodiments, the payload may include network protocol header information as provided by the client application and/or the network stack that may be used by the client application. For example, if the client is using TCP/IP to communication, the client security application may transparently wrap each TCP/IP packet to include header 1602, header 1604, and security header 1606.

In at least one of the various embodiments, for additional protection the security header may also be encrypted using a key such as, the network packet key or the transport key. In such embodiments, the security header may be decrypted before it is provided to the packet inspection engine of the network interface.

FIG. 16B illustrates a logical schematic of security header 1610 used for communicating with a security application server in accordance with at least one of the various embodiments. In at least one of the various embodiments, a security header may include various information in addition to a network transport key. For example, in at least one of the various embodiments, security header 1610 may include network packet key field 1612 and one or more fields such as accounting reliability information field 1614. Field 1612 contains the network packet key and field 1614 includes additional information, such as, check sums, packet sequence numbers, or the like.

Generalized Operation of Transparent Denial of Service Protection

The operation of certain aspects of the invention will now be described with respect to FIGS. 17-20. In at least one of various embodiments, processes 1700, 1800, 1900, and 2000 described in conjunction with FIGS. 17-20, respectively, may be implemented by and/or executed on a network computer, such as network computer 300 of FIG. 3. In other embodiments, these processes or portions of these processes may be implemented by and/or executed on a plurality of network computers, such as network computer 300 of FIG. 3. Further, in other embodiments, these processes or portions of these processes may be implemented by and/or executed on one or more client computers, such as client computer 200 as shown in FIG. 2. Also, in at least one of the various embodiments, these processes or portions of these processes may be implemented by and/or executed on one or more cloud instances operating in one or more cloud networks. However, embodiments are not so limited and various combinations of network computers, client computer, cloud computer, or the like, may be utilized.

Figure 17:
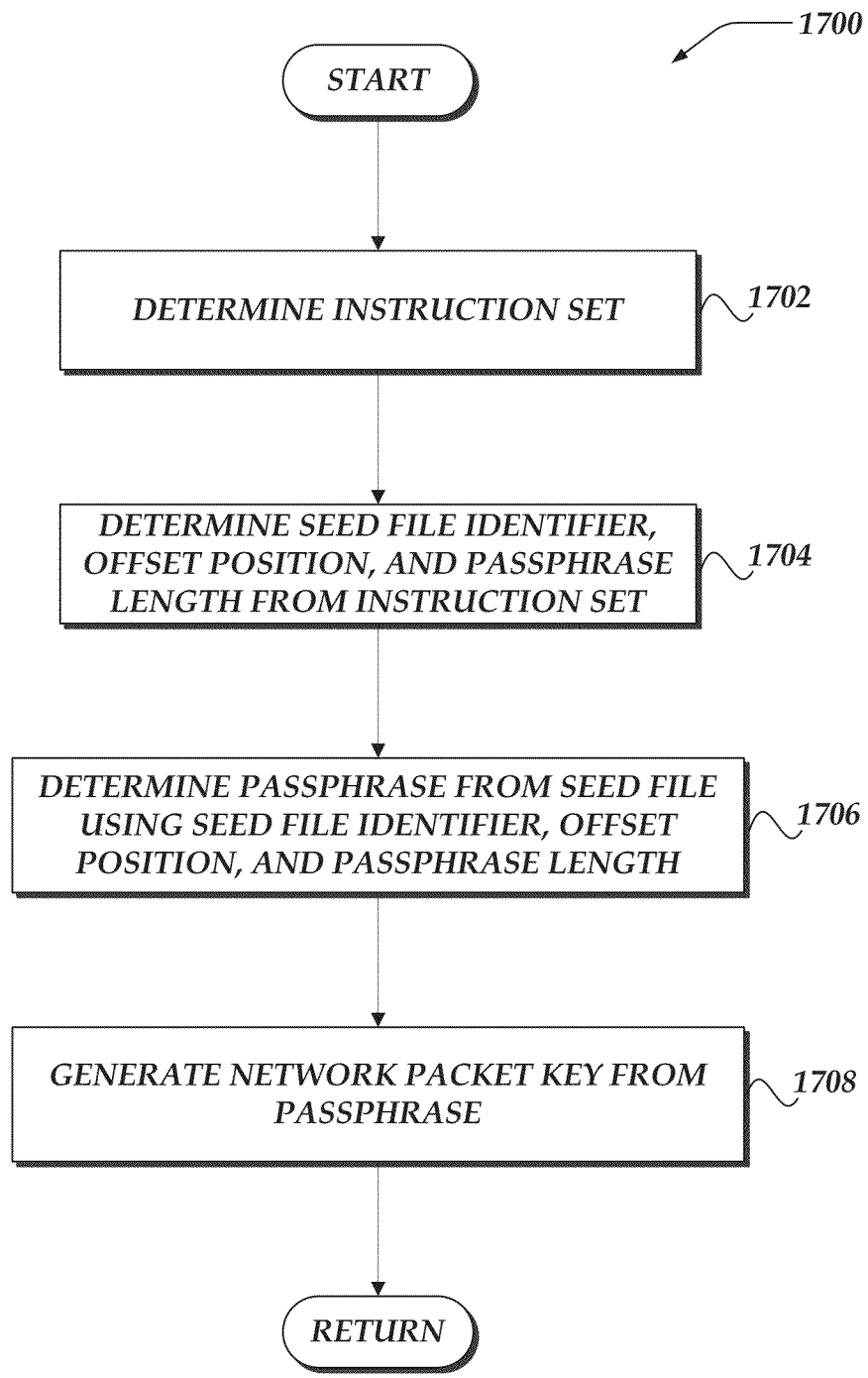
FIG. 17 shows an overview flowchart for a process for transparent denial of service protection in accordance with at least one of the various embodiments.

FIG. 17 shows an overview flowchart for process 1700 for transparent denial of service protection in accordance with at least one of the various embodiments. After a start block, at block 1702, in at least one of the various embodiments, an instruction set may be determined. In at least one of the various embodiments, a client security application, such as, security application 217 may obtain an instruction set from a server security application, such as, security application 320.

In at least one of the various embodiments, steps described for FIGS. 5B and/or 5C may be performed to generate an instruction set corresponding to a network packet key. In at least one of the various embodiments, the instruction set for generating the network packet key may be provided to the client security application, at various times, such as, when the client security application is provisioned/registered with the security application server; during establishment of a communication session (e.g., at the same time an instruction for a transport key is provided); upon the expiration of a timeout; as requested by a user or administrator; or the like.

At block 1704, in at least one of the various embodiments, process 1700 may determine the necessary values from the instruction set, such as, the seed file ID, offset position, and pass-phrase length. At block 1706, in at least one of the various embodiments, process 1700 may determine the pass-phrase from a seed file based on the instruction set values.

At block 1708, in at least one of the various embodiments, process 1700 may generate the transport key from the pass-phrase. In at least one of the various embodiments, various deterministic techniques may be employed to generate the transport key from the pass-phrase. For example, in at least one of the various embodiments, a one-way cryptographically secure hash algorithm may be employed to generate the transport key from the pass-phrase. Next, control may be returned to a calling process.

Figure 18:
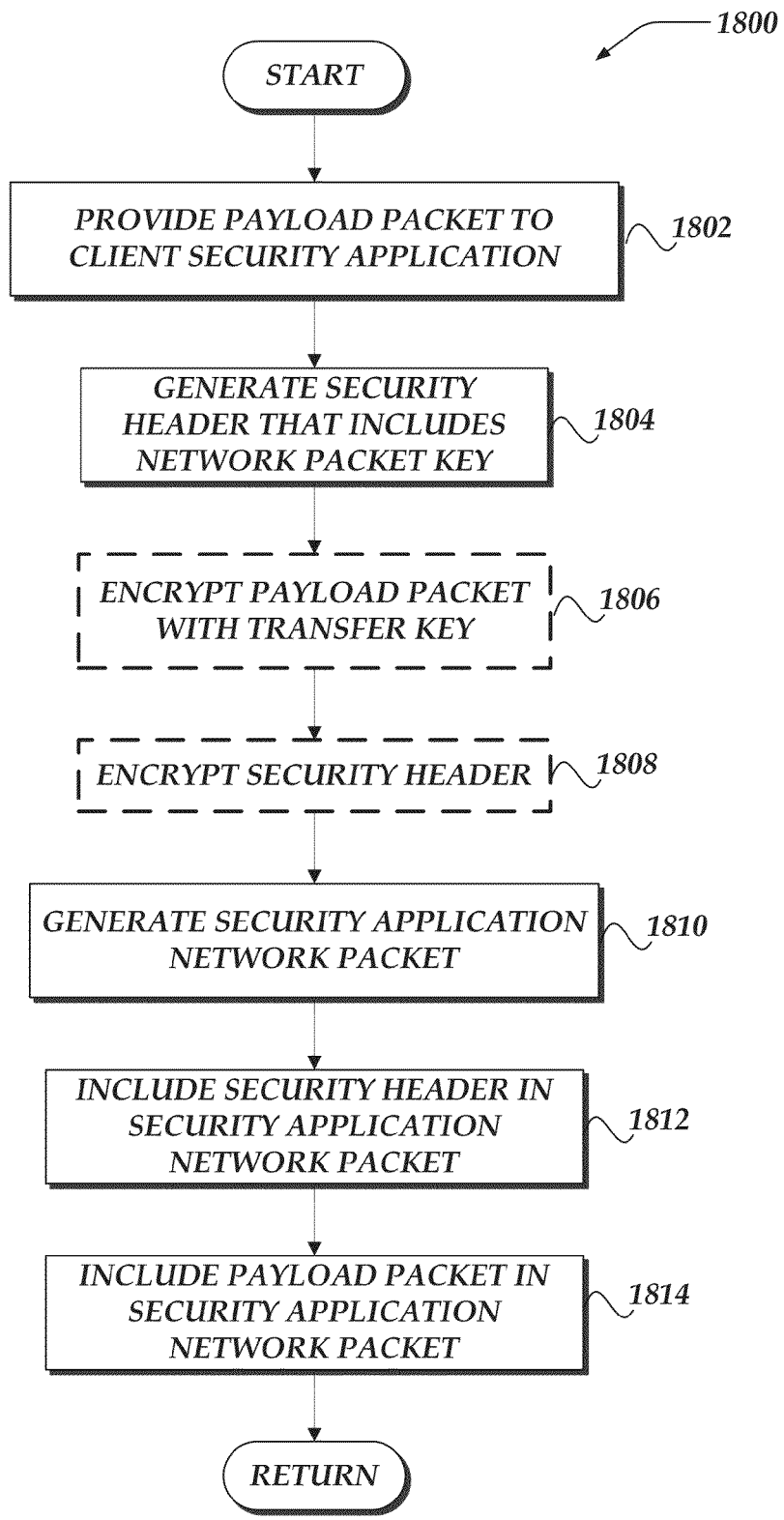
FIG. 18 shows an overview flowchart for a process for transparent denial of service protection in accordance with at least one of the various embodiments.

FIG. 18 shows an overview flowchart for process 1800 for transparent denial of service protection in accordance with at least one of the various embodiments. After a start block, at block 1802, in at least one of the various embodiments, a client security application may be provided a payload packet that include information a client application intends to provide to the server application.

At block 1804, in at least one of the various embodiments, the security application may generate information for the security header that includes the network packet key. In at least one of the various embodiments, if the network packet key needs to be generated it may be generated using the network packet key instruction set that was provided by the server security application. As described above, it the security header is arranged to include additional information such as checksum, sequence numbers, or the like, they may be generated here. For example, in at least one of the various embodiments, the security application may be arranged to generate a checksum value of the payload data and include it in the security header.

At block 1806, in at least one of the various embodiments, optionally, the security application may encrypt the payload packet as described above. Also, in at least one of the various embodiments, the security application may compress the payload as well as encrypt depending on how the security application may be configured.

At block 1808, in at least one of the various embodiments, optionally, the security application may encrypt the security header. In at least one of the various embodiments, the security may be encrypted with the network transport key, a transport key, or the like. This block is optional because in some embodiments, the security header may remain unencrypted.

At block 1810, in at least one of the various embodiments, the security application may take generate a security network packet, such as, packet 1600 in FIG. 16A. At block 1812, in at least one of the various embodiments, the security header may be included in the security application network packet.

At block 1814, in at least one of the various embodiments, the payload packet may be added to the security application packet. Note, in some embodiments, the security application may be arranged to generate a security application packet that includes the payload packet and the security header in a single step at block 1810. Next, control may be returned to a calling process.

Figure 19:
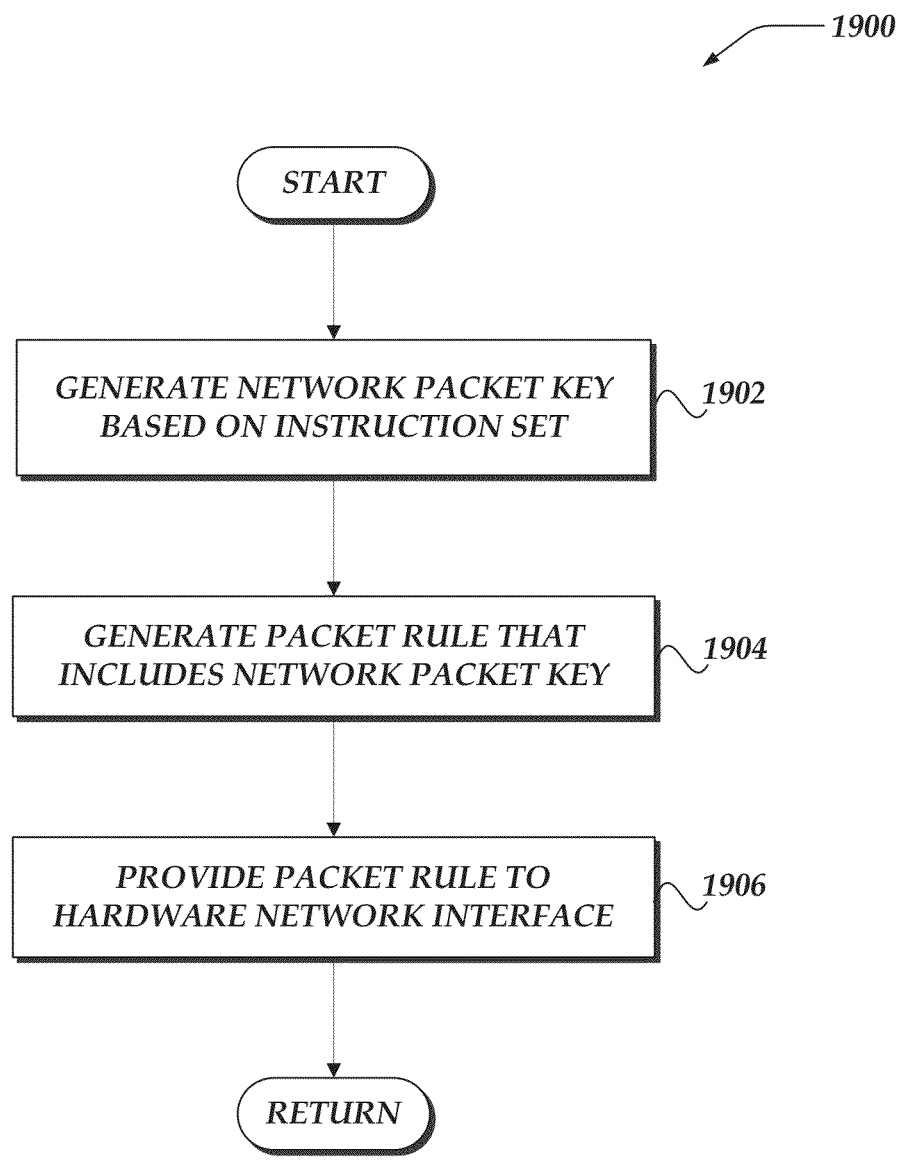
FIG. 19 illustrates a flowchart for a process for installing a packet rule in accordance with at least one of the various embodiments.

FIG. 19 illustrates a flowchart for process 1900 for installing a packet rule in accordance with at least one of the various embodiments. After a start block, at block 1902, in at least one of the various embodiments, a server security application may generate a network packet key based on an instruction set. In at least one of the various embodiments, the instruction set may have the same values as the instruction set used by the client security application for generating the network packet key used by the client security application.

At block 1904, in at least one of the various embodiments, the server security application may generate a packet rule that includes the network packet key. In at least one of the various embodiments, the particular format and structure of the packet rule may depend on the specifications of the network interface that will be used. For example, in at least one of the various embodiments, the packet rule may be defined using a higher level computer programming language and/or script that may be compiled into a lower level format.

At block 1906, in at least one of the various embodiments, the packet rule may be provided to the hardware network interface. In at least one of the various embodiments, the packet rule provided by writing the network packet key to one or more registers in the network interface and setting one or more command flags. For example, command flags sent to the network interface to activate the network interface to discard incoming network packets that do not include a network packet key that matched the network packet key stored in one or more registers of the network interface. In any event, the packet rule defined to exclude network packets that omit the correct network packet key may be installed in the packet ingestion of the network interface accordingly the API/command-set supported by the particular network interface used by application server computer. Next, control may be returned to a calling process.

Figure 20:
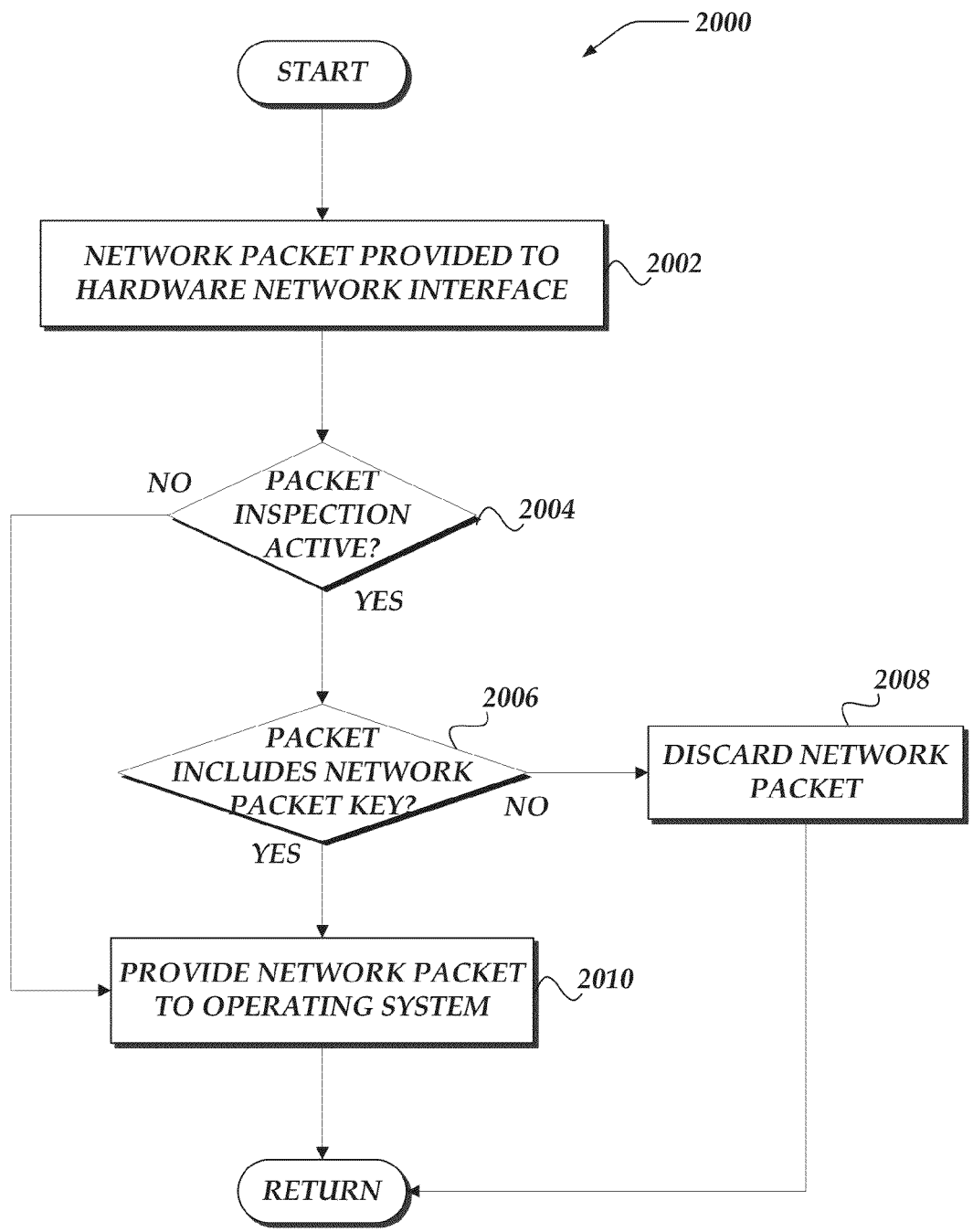
FIG. 20 illustrates a flowchart for process for filtering incoming packets based on a network packet key in accordance with at least one of the various embodiments.

FIG. 20 illustrates a flowchart for process 2000 for filtering incoming packets based on a network packet key in accordance with at least one of the various embodiments. After a start block, at block 2002, in at least one of the various embodiments, a network packet may be provided to a hardware network interface.

At decision block 2004, in at least one of the various embodiments, if packet inspections for transparent protection against denial of service attacks is activated, control may flow to decision block 2006; otherwise, control may flow to 2010.

At decision block 2006, in at least one of the various embodiments, if the network packet includes the network packet key, control may flow to block 2010; otherwise, control may flow to block 2008. In at least one of the various embodiments, the packet inspections engine may be arranged to examine the security header of the network packet to determine if the appropriate network packet key is included.

In at least one of the various embodiments, there may be more than one network packet key based packet rule installed in a given network interface. Accordingly, in some embodiments, the network interface may be arranged to determine if the security header of the network packet includes any of the network packet keys that may be installed on the network interface.

At block 2008, in at least one of the various embodiments, the network packet may be discarded or otherwise, ignored. In at least one of the various embodiments, since the network interface is discarding the network packet, they will be discarded without impacting the CPU performance or memory of the application server computer. Next, control may be returned to a calling process.

At block 2010, in at least one of the various embodiments, the network interface may provide the incoming network packet to the operating system of the application server computer for further processing. Next, control may be returned to a calling process.

It will be understood that each block of the flowchart the illustrations, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowcharts to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

What is claimed as new and desired to be protected by Letters Patent of the United States is:

1. A method for managing communication over a network using a network computer that performs actions, comprising:
   generating instruction set information that references at least a seed file that is installed on the network computer;
   communicating a copy of the instruction set information to a client computer;
   generating a network packet key based on the instruction set information;
   generating a packet rule that includes the network packet key, wherein the packet rule is installed in a packet inspection engine that is included in a hardware network interface; and
   when one or more network packets are communicated to the network computer, the packet inspection engine performing further actions, including:
   comparing the network packet key to the one or more network packets using the packet rule; and
   accepting each of the one or more network packets that include the network packet key and discarding each of the one or more network packets that omit the network packet key, wherein the accepted one or more network packets are provided to an operating system of the network computer.

2. The method of claim 1, further comprising:
   employing the client computer to generate a client network packet key based on the provided instruction set information and at least another seed file that is installed on the client computer, wherein the client network packet key and the network packet key have the same value; and
   including the client network packet key in the one or more network packets before they are provided to the network computer.

3. The method of claim 1, further comprising, when the one or more network packets is encrypted by the client computer, decrypting the one or more encrypted network packets before comparing the network packet key to the one or more network packets using the packet rule.

4. The method of claim 1, wherein generating the network packet key, further comprises:
determining the seed file from a plurality of seed files based on an identifier that is included in the instruction set information;
extracting a pass phrase from the seed file based on an offset value and a pass phrase length value that are included in the instruction set information; and
generating the network packet key based on the pass phrase that is extracted from the seed file.

5. The method of claim 1, further comprising:
employing the client computer to generate security header information that includes the network packet key;
employing the client computer to include an application network packet in a security network packet that includes the security header information; and
employing the client computer to communicate the security network packet to the network computer.

6. The method of claim 1, further comprising, registering the client computer with the network computer based on an exchange of credentials that includes at least a client identifier.

7. The method of claim 1, wherein generating the network packet key further comprises employing a sensor to introduce entropy.

8. A system for managing communication over a network, comprising:
a network computer, comprising:
a transceiver that communicates over the network;
a memory that stores at least instructions; and
a processor device that executes instructions that perform actions, including:
generating instruction set information that references at least a seed file that is installed on the network computer;
communicating a copy of the instruction set information to a client computer;
generating a network packet key based on the instruction set information;
generating a packet rule that includes the network packet key, wherein the packet rule is installed in a packet inspection engine that is included in a hardware network interface; and
when one or more network packets are communicated to the network computer, the packet inspection engine performing further actions, including:
comparing the network packet key to the one or more network packets using the packet rule; and
accepting each of the one or more network packets that include the network packet key and discarding each of the one or more network packets that omit the network packet key, wherein the accepted one or more network packets are provided to an operating system of the network computer; and
a client computer, comprising:
a transceiver that communicates over the network;
a memory that stores at least instructions; and
a processor device that executes instructions that perform actions, including:
generating a client network packet key based on the provided instruction set information and at least another seed file that is installed on the client computer, wherein the client network packet key and the network packet key have the same value; and
including the client network packet key in the one or more network packets before they are provided to the network computer.

9. The system of claim 8, wherein the network computer processor device executes instructions that perform further actions, comprising, when the one or more network packets is encrypted by the client computer, decrypting the one or more encrypted network packets before comparing the network packet key to the one or more network packets using the packet rule.

10. The system of claim 8, wherein generating the network packet key, further comprises:
determining the seed file from a plurality of seed files based on an identifier that is included in the instruction set information;
extracting a pass phrase from the seed file based on an offset value and a pass phrase length value that are included in the instruction set information; and
generating the network packet key based on the pass phrase that is extracted from the seed file.

11. The system of claim 8, wherein the client computer processor device executes instructions that perform further actions, comprising:
generating security header information that includes the network packet key;
including an application network packet in a security network packet that includes the security header information; and
communicating the security network packet to the network computer.

12. The system of claim 8, further comprising, registering the client computer with the network computer based on an exchange of credentials that includes at least a client identifier.

13. The system of claim 8, wherein generating the network packet key further comprises employing a sensor to introduce entropy.

14. A processor readable non-transitory storage media that includes instructions for managing communication over a network, wherein execution of the instructions by a hardware processor performs actions, comprising:
generating instruction set information that references at least a seed file that is installed on the network computer;
communicating a copy of the instruction set information to a client computer;
generating a network packet key based on the instruction set information;
generating a packet rule that includes the network packet key, wherein the packet rule is installed in a packet inspection engine that is included in a hardware network interface; and
when one or more network packets are communicated to the network computer, the packet inspection engine performing further actions, including:
comparing the network packet key to the one or more network packets using the packet rule; and
accepting each of the one or more network packets that include the network packet key and discarding each of the one or more network packets that omit the network packet key, wherein the accepted one or more network packets are provided to an operating system of the network computer.

15. The media of claim 14, further comprising:
employing the client computer to generate a client network packet key based on the provided instruction set information and at least another seed file that is installed on the client computer, wherein the client network packet key and the network packet key have the same value; and including the client network packet key in the one or more network packets before they are provided to the network computer.

16. The media of claim 14, further comprising, when the one or more network packets is encrypted by the client computer, decrypting the one or more encrypted network packets before comparing the network packet key to the one or more network packets using the packet rule.

17. The media of claim 14, wherein generating the network packet key, further comprises:
   determining the seed file from a plurality of seed files based on an identifier that is included in the instruction set information;
   extracting a pass phrase from the seed file based on an offset value and a pass phrase length value that are included in the instruction set information; and
   generating the network packet key based on the pass phrase that is extracted from the seed file.

18. The media of claim 14, further comprising:
   employing the client computer to generate security header information that includes the network packet key;
   employing the client computer to include an application network packet in a security network packet that includes the security header information; and
   employing the client computer to communicate the security network packet to the network computer.

19. The media of claim 14, further comprising, registering the client computer with the network computer based on an exchange of credentials that includes at least a client identifier.

20. The media of claim 14, wherein generating the network packet key further comprises employing a sensor to introduce entropy.

21. A network computer for managing communication over a network, comprising:
   a transceiver that communicates over the network;
   a memory that stores at least instructions; and
   a processor device that executes instructions that perform actions, including:
      generating instruction set information that references at least a seed file that is installed on the network computer;
      communicating a copy of the instruction set information to a client computer;
      generating a network packet key based on the instruction set information;
      generating a packet rule that includes the network packet key, wherein the packet rule is installed in a packet inspection engine that is included in a hardware network interface; and
      when one or more network packets are communicated to the network computer, the packet inspection engine performing further actions, including:
         comparing the network packet key to the one or more network packets using the packet rule; and
         accepting each of the one or more network packets that include the network packet key and discarding each of the one or more network packets that omit the network packet key, wherein the accepted one or more network packets are provided to an operating system of the network computer.

22. The network computer of claim 21, further comprising:
   employing the client computer to generate a client network packet key based on the provided instruction set information and at least another seed file that is installed on the client computer, wherein the client network packet key and the network packet key have the same value; and
   including the client network packet key in the one or more network packets before they are provided to the network computer.

23. The network computer of claim 21, further comprising, when the one or more network packets is encrypted by the client computer, decrypting the one or more encrypted network packets before comparing the network packet key to the one or more network packets using the packet rule.

24. The network computer of claim 21, wherein generating the network packet key, further comprises:
   determining the seed file from a plurality of seed files based on an identifier that is included in the instruction set information;
   extracting a pass phrase from the seed file based on an offset value and a pass phrase length value that are included in the instruction set information; and
   generating the network packet key based on the pass phrase that is extracted from the seed file.

25. The network computer of claim 21, further comprising:
   employing the client computer to generate security header information that includes the network packet key;
   employing the client computer to include an application network packet in a security network packet that includes the security header information; and
   employing the client computer to communicate the security network packet to the network computer.

26. The network computer of claim 21, further comprising, registering the client computer with the network computer based on an exchange of credentials that includes at least a client identifier.

27. The network computer of claim 21, wherein generating the network packet key further comprises employing a sensor to introduce entropy.

* * * * *